US012806695B2

(12) United States Patent
Place et al.

(10) Patent No.: US 12,806,695 B2
(45) Date of Patent: Nov. 24, 2026

(54) PORTABLE BORING MACHINE

(71) Applicant: Enerpac Tool Group Corp., Menomonee Falls, WI (US)

(72) Inventors: Brent K. Place, Hager City, WI (US); Ricardas Balvocius, Menomonee Falls, WI (US)

(73) Assignee: Enerpac Tool Group Corp., Milwaukee, WI (US)

( * ) Notice: Subject to any disclaimer, the term of this patent is extended or adjusted under 35 U.S.C. 154(b) by 361 days.

(21) Appl. No.: 18/392,005

(22) Filed: Dec. 21, 2023

(65) Prior Publication Data

US 2024/0217004 A1 Jul. 4, 2024

Related U.S. Application Data

(60) Provisional application No. 63/478,014, filed on Dec. 30, 2022.

(51) Int. Cl.
*B23B 29/02* (2006.01)
*B23B 39/14* (2006.01)

(52) U.S. Cl.
CPC ............ *B23B 29/025* (2013.01); *B23B 39/14* (2013.01)

(58) Field of Classification Search
CPC .............................. B23B 29/025; B23B 39/14
See application file for complete search history.

(56) References Cited

U.S. PATENT DOCUMENTS

| | | | | |
|---|---|---|---|---|
| 924,232 | A | | 6/1909 | Jensen |
| 1,792,820 | A | | 2/1931 | Cox |
| 1,814,079 | A | * | 7/1931 | Cole ................. B23B 29/03407 408/173 |
| 1,953,402 | A | | 4/1934 | Graham |
| 2,235,924 | A | | 3/1941 | Gignoux |
| 2,800,041 | A | * | 7/1957 | Sten .................... B23B 29/0341 403/104 |
| 3,327,572 | A | * | 6/1967 | Lovendahl .......... B23B 29/0341 408/239 R |
| 3,343,431 | A | * | 9/1967 | Boyer ................. B23B 29/0341 407/104 |

(Continued)

FOREIGN PATENT DOCUMENTS

| | | |
|---|---|---|
| DE | 2542679 A1 | 3/1977 |
| DE | 2603482 A1 | 8/1977 |

(Continued)

OTHER PUBLICATIONS

Climax Portable Machining & Welding Systems, BB8100 Boring Machine Operating Manual, Sep. 2019.

(Continued)

*Primary Examiner* — Bayan Salone

(74) *Attorney, Agent, or Firm* — Andrus Intellectual Property Law, LLP

(57) ABSTRACT

A boring bar assembly, a feed assembly, an alignment device for a boring bar assembly. The boring bar assembly may include a boring bar extending along a bar axis; a drive unit including a drive unit housing, and a drive mechanism supported by the drive unit housing and operable to rotate the bar about the bar axis; a feed assembly configured to move the bar along the bar axis; and a lead screw engageable with the feed assembly and defining a lead screw axis.

22 Claims, 14 Drawing Sheets

(56) References Cited

U.S. PATENT DOCUMENTS

| | | | | | |
|---|---|---|---|---|---|
| 3,344,693 | A | | 10/1967 | Scholl | |
| 3,371,559 | A | | 3/1968 | Scholl | |
| 3,511,119 | A | | 5/1970 | Hielm | |
| 3,744,352 | A | | 7/1973 | Scholl | |
| 3,800,637 | A | | 4/1974 | Scholl | |
| 3,854,839 | A | | 12/1974 | Gottelt | |
| 3,856,427 | A | * | 12/1974 | Lovendahl | B23B 29/0341 408/239 R |
| 4,043,695 | A | | 8/1977 | Gottelt | |
| 4,050,836 | A | | 9/1977 | Anders | |
| 4,106,880 | A | | 8/1978 | Anders | |
| 4,161,127 | A | | 7/1979 | Tiffin | |
| 4,176,565 | A | | 12/1979 | Christoph | |
| 4,668,133 | A | | 5/1987 | Campbell | |
| 4,770,074 | A | | 9/1988 | Kwech | |
| 4,813,314 | A | | 3/1989 | Kwech | |
| 4,824,296 | A | | 4/1989 | Strait | |
| 4,842,452 | A | | 6/1989 | Strait | |
| 4,850,756 | A | | 7/1989 | Dubois | |
| 4,856,945 | A | | 8/1989 | Bareis | |
| 4,932,814 | A | | 6/1990 | York | |
| 4,954,023 | A | | 9/1990 | Bromley | |
| 4,979,850 | A | | 12/1990 | Dompe | |
| 4,981,401 | A | | 1/1991 | Banke | |
| 4,990,037 | A | | 2/1991 | Strait | |
| 5,030,041 | A | | 7/1991 | Marron | |
| 5,062,187 | A | | 11/1991 | Bromley | |
| 5,125,299 | A | | 6/1992 | Strait | |
| 5,150,496 | A | | 9/1992 | Bromley | |
| 5,183,365 | A | | 2/1993 | Silk | |
| 5,209,615 | A | | 5/1993 | Davis | |
| 5,298,710 | A | | 3/1994 | Acheson | |
| 5,350,259 | A | | 9/1994 | Russo | |
| 5,558,268 | A | | 9/1996 | Acheson | |
| 5,642,696 | A | | 7/1997 | Matsui | |
| 5,642,969 | A | * | 7/1997 | Strait | B23Q 11/0092 408/124 |
| 5,732,607 | A | | 3/1998 | Strait | |
| 5,785,466 | A | | 7/1998 | Haynes | |
| 5,954,462 | A | | 9/1999 | Way | |
| 6,295,707 | B1 | | 10/2001 | Siracusa | |
| 6,447,220 | B1 | | 9/2002 | Ricci | |
| 6,619,165 | B2 | | 9/2003 | Perkowski | |
| 6,711,976 | B2 | | 3/2004 | Ostertag | |
| 6,755,598 | B2 | | 6/2004 | Rowland | |
| 6,840,719 | B2 | | 1/2005 | Tugend | |
| 6,846,136 | B2 | | 1/2005 | Brock | |
| 6,974,285 | B2 | | 12/2005 | Johne | |
| 6,990,878 | B2 | | 1/2006 | Ricci | |
| 7,011,477 | B2 | | 3/2006 | Hecht | |
| 7,028,997 | B2 | | 4/2006 | Takahashi | |
| 7,029,210 | B2 | | 4/2006 | Schlagenhauf | |
| 7,059,809 | B2 | | 6/2006 | Oettle | |
| 7,066,690 | B2 | | 6/2006 | Ebert | |
| 7,069,829 | B2 | | 7/2006 | Ricci | |
| 7,090,445 | B2 | | 8/2006 | Woodruff | |
| 7,121,768 | B2 | | 10/2006 | Hole | |
| 7,140,819 | B2 | | 11/2006 | Broghammer | |
| 7,156,588 | B2 | | 1/2007 | Elbaz | |
| 7,240,593 | B2 | | 7/2007 | Little | |
| 7,309,194 | B2 | | 12/2007 | Keefe | |
| 7,322,778 | B2 | | 1/2008 | Woodruff | |
| 7,371,032 | B2 | | 5/2008 | Jansson | |
| 7,384,219 | B2 | | 6/2008 | Weidmer | |
| 7,396,196 | B2 | | 7/2008 | Oettle | |
| 7,422,398 | B2 | | 9/2008 | Wirtanen | |
| 7,441,993 | B2 | | 10/2008 | Evans | |
| 7,455,487 | B2 | | 11/2008 | Chang | |
| 7,490,536 | B2 | | 2/2009 | Murakami | |
| 7,507,057 | B2 | | 3/2009 | Beier | |
| 7,524,149 | B2 | | 4/2009 | Heule | |
| 7,591,209 | B2 | | 9/2009 | Murakami | |
| 7,597,033 | B2 | | 10/2009 | Savoie | |
| 7,607,209 | B2 | | 10/2009 | Iizumi | |
| 7,681,869 | B2 | | 3/2010 | Digernes | |
| 7,717,652 | B2 | | 5/2010 | Weidmer | |
| 7,731,457 | B2 | | 6/2010 | Pigeat | |
| 7,753,626 | B2 | | 7/2010 | Musil | |
| 7,765,904 | B2 | | 8/2010 | Tejeda | |
| 7,770,498 | B2 | | 8/2010 | Sorensen | |
| 7,793,574 | B2 | | 9/2010 | Sorensen | |
| 7,806,635 | B2 | | 10/2010 | Weidmer | |
| 7,857,554 | B2 | | 12/2010 | Saeterboe | |
| 7,901,162 | B2 | | 3/2011 | German | |
| 7,908,947 | B2 | | 3/2011 | Saeterboe | |
| 7,930,957 | B2 | | 4/2011 | Travez | |
| 8,020,474 | B2 | | 9/2011 | Mihic | |
| 8,033,765 | B2 | | 10/2011 | Frank | |
| 8,136,432 | B2 | | 3/2012 | Travez | |
| 8,151,672 | B2 | | 4/2012 | Esslinger | |
| 8,240,961 | B2 | | 8/2012 | Mihic | |
| 8,276,488 | B2 | | 10/2012 | Backhouse | |
| 8,287,214 | B2 | | 10/2012 | Sadaoka | |
| 8,308,404 | B2 | | 11/2012 | Ostermann | |
| 8,322,952 | B2 | | 12/2012 | Tugend | |
| 8,360,693 | B2 | | 1/2013 | Katzenberger | |
| 8,371,776 | B2 | | 2/2013 | Lin | |
| 8,388,277 | B2 | | 3/2013 | Gray | |
| 8,408,849 | B2 | | 4/2013 | Craig | |
| 8,430,610 | B2 | | 4/2013 | Komai | |
| 8,469,639 | B2 | | 6/2013 | Nedzlek | |
| 8,479,622 | B2 | | 7/2013 | Hecht | |
| 8,506,210 | B2 | | 8/2013 | Nedzlek | |
| 8,506,211 | B2 | | 8/2013 | Frank | |
| 8,516,935 | B2 | | 8/2013 | Inoue | |
| 8,545,138 | B2 | | 10/2013 | Wilkins | |
| 8,561,509 | B2 | | 10/2013 | Craig | |
| 8,573,904 | B2 | | 11/2013 | Weisel | |
| 8,590,125 | B2 | | 11/2013 | Tirre | |
| 8,602,695 | B2 | | 12/2013 | Bignotto | |
| 8,608,412 | B2 | | 12/2013 | Esslinger | |
| 8,678,721 | B2 | | 3/2014 | Shozda | |
| 8,684,638 | B2 | | 4/2014 | Buck | |
| 8,734,070 | B2 | | 5/2014 | De Souza Filho | |
| 8,770,312 | B2 | | 7/2014 | Kume | |
| 8,770,899 | B2 | | 7/2014 | Frank | |
| 8,839,699 | B2 | | 9/2014 | Nishitani | |
| 8,845,245 | B2 | | 9/2014 | Haas | |
| 8,881,354 | B2 | | 11/2014 | Nakamura | |
| 8,887,828 | B2 | | 11/2014 | Dillman | |
| 8,895,160 | B2 | | 11/2014 | Mihic | |
| 8,899,891 | B2 | | 12/2014 | Freyermuth | |
| 8,905,688 | B1 | | 12/2014 | Moore | |
| 8,950,985 | B2 | | 2/2015 | Durand-Terrasson | |
| 8,956,092 | B2 | | 2/2015 | Lundblad | |
| 8,978,526 | B2 | | 3/2015 | Nedzlek | |
| 8,978,527 | B2 | | 3/2015 | Yang | |
| 8,985,916 | B2 | | 3/2015 | Kocherovsky | |
| 8,992,139 | B2 | | 3/2015 | Wretland | |
| 9,027,720 | B2 | | 5/2015 | Ogata | |
| 9,028,178 | B2 | | 5/2015 | Nedzlek | |
| 9,033,623 | B2 | | 5/2015 | Nakamura | |
| 9,073,124 | B2 | | 7/2015 | Schuffenhauer | |
| 9,073,129 | B2 | | 7/2015 | Craig | |
| 9,079,256 | B2 | | 7/2015 | Freyermuth | |
| 9,120,152 | B2 | | 9/2015 | Kay | |
| 9,162,291 | B2 | | 10/2015 | Wiest | |
| 9,168,594 | B2 | | 10/2015 | Guo | |
| 9,227,245 | B2 | | 1/2016 | Tsai | |
| 9,242,329 | B2 | | 1/2016 | Vedel | |
| 9,283,624 | B2 | | 3/2016 | Freyermuth | |
| 9,308,587 | B2 | | 4/2016 | Kitagawa | |
| 9,321,110 | B2 | | 4/2016 | Kasubata | |
| 9,475,124 | B2 | | 10/2016 | Kay | |
| 9,475,127 | B2 | | 10/2016 | Jensen | |
| 9,475,132 | B2 | | 10/2016 | Kocherovsky | |
| 9,482,275 | B2 | | 11/2016 | Rittman | |
| 9,511,467 | B2 | | 12/2016 | Whitbeck | |
| 9,517,511 | B1 | | 12/2016 | Sisco | |
| 9,533,357 | B2 | | 1/2017 | Frota De Souza Filho | |
| 9,545,673 | B2 | | 1/2017 | Hirose | |
| 9,579,730 | B2 | | 2/2017 | Frota De Souza Filho | |
| 9,586,266 | B2 | | 3/2017 | Eichelberger | |
| 9,623,484 | B2 | | 4/2017 | Pierce | |

(56) References Cited

U.S. PATENT DOCUMENTS

| | | | | |
|---|---|---|---|---|
| 9,623,530 | B2 | 4/2017 | Tan | |
| 9,649,695 | B1 | 5/2017 | Smith | |
| 9,669,501 | B1 | 6/2017 | Dolan | |
| 9,695,497 | B2 | 7/2017 | Watanabe | |
| 9,718,133 | B2 | 8/2017 | Schmidt | |
| 9,744,599 | B2 | 8/2017 | Frank | |
| 9,753,448 | B2 | 9/2017 | Valsecchi | |
| 9,770,770 | B2 | 9/2017 | Mada | |
| 9,782,832 | B1 | 10/2017 | Lambrick | |
| 9,782,841 | B2 | 10/2017 | Pfeuffer | |
| 9,789,547 | B2 | 10/2017 | Hacker | |
| 9,849,492 | B2 | 12/2017 | Roettger | |
| 9,849,518 | B2 | 12/2017 | Da Silva | |
| 9,855,611 | B2 | 1/2018 | Eichelberger | |
| 9,862,032 | B2 | 1/2018 | Haimer | |
| 9,862,040 | B2 | 1/2018 | Kocherovsky | |
| 9,868,158 | B2 | 1/2018 | Da Silva | |
| 9,868,182 | B1 | 1/2018 | Smith | |
| 9,889,506 | B2 | 2/2018 | Nakatani | |
| 9,914,175 | B2 | 3/2018 | Kato | |
| 9,950,374 | B2 | 4/2018 | Bruder | |
| 9,956,620 | B2 | 5/2018 | Weidinger | |
| 9,987,688 | B2 | 6/2018 | Gehlsen | |
| 9,993,876 | B2 | 6/2018 | Hecht | |
| 9,993,879 | B1 | 6/2018 | Eichelberger | |
| 9,999,928 | B2 | 6/2018 | Paul | |
| 10,010,943 | B2 | 7/2018 | Kim | |
| 10,022,806 | B2 | 7/2018 | Langbein | |
| 10,040,127 | B2 | 8/2018 | Frota De Souza Filho | |
| 10,065,246 | B2 | 9/2018 | Coakley | |
| 10,076,790 | B2 | 9/2018 | Marcelo Euripedes | |
| 10,076,792 | B2 * | 9/2018 | Place | B23B 29/02 |
| 10,086,439 | B2 | 10/2018 | Ogata | |
| 10,086,440 | B2 | 10/2018 | Buck | |
| 10,099,292 | B2 | 10/2018 | Coakley | |
| 10,105,768 | B2 | 10/2018 | Chen | |
| 10,107,255 | B2 | 10/2018 | Ohl, Jr. | |
| 10,113,608 | B2 | 10/2018 | Freyermuth | |
| 10,124,424 | B2 | 11/2018 | Frota De Souza Filho | |
| 10,137,512 | B2 | 11/2018 | Schmidt | |
| 10,155,268 | B2 | 12/2018 | Takashima | |
| 10,160,045 | B2 | 12/2018 | Nedzlek | |
| 10,195,680 | B2 | 2/2019 | Dejaune | |
| 10,221,806 | B2 | 3/2019 | Whitbeck | |
| 10,254,104 | B2 | 4/2019 | Eichelberger | |
| 10,384,267 | B2 | 8/2019 | Umstadt | |
| 10,406,604 | B2 | 9/2019 | Filiatrault | |
| 10,413,971 | B1 | 9/2019 | Smith | |
| 10,500,648 | B1 | 12/2019 | Saffouri | |
| 10,549,353 | B2 | 2/2020 | Sasaki | |
| 10,556,271 | B2 | 2/2020 | Bruinsma | |
| 10,562,143 | B2 | 2/2020 | Rattunde | |
| 10,569,340 | B2 | 2/2020 | Gehlsen | |
| 10,583,496 | B2 | 3/2020 | Meiser | |
| 10,589,359 | B2 | 3/2020 | Barny | |
| 10,612,119 | B2 | 4/2020 | Agapiou | |
| 10,618,117 | B2 | 4/2020 | Haimer | |
| 10,625,384 | B2 | 4/2020 | Park | |
| 10,632,583 | B1 | 4/2020 | Giannetti | |
| 10,654,110 | B2 | 5/2020 | Hacker | |
| 10,661,350 | B2 | 5/2020 | Coakley | |
| 10,717,132 | B2 | 7/2020 | Ebert | |
| 10,744,570 | B2 | 8/2020 | Lemoine | |
| 10,835,960 | B2 | 11/2020 | Pierce | |
| 10,835,962 | B2 | 11/2020 | Esslinger | |
| 10,857,599 | B2 | 12/2020 | Marchione | |
| 2004/0000043 | A1 | 1/2004 | Siracusa | |
| 2005/0155470 | A1 | 7/2005 | Ricci | |
| 2008/0060490 | A1 | 3/2008 | Sorensen | |
| 2010/0189522 | A1 | 7/2010 | Esslinger | |
| 2011/0079585 | A1 | 4/2011 | Cambrey | |
| 2011/0131781 | A1 | 6/2011 | Smith | |
| 2012/0291282 | A1 | 11/2012 | Sperring | |
| 2015/0052721 | A1 | 2/2015 | Mauro | |
| 2015/0056033 | A1 | 2/2015 | Esslinger | |
| 2015/0151363 | A1 | 6/2015 | Backhouse | |
| 2015/0196958 | A1 | 7/2015 | Ebert | |
| 2016/0368109 | A1 * | 12/2016 | Place | B23B 39/14 |
| 2017/0120348 | A1 | 5/2017 | Stephenson | |
| 2018/0313223 | A1 | 11/2018 | Bird | |
| 2019/0111498 | A1 | 4/2019 | Fitzgerald | |
| 2019/0375025 | A1 | 12/2019 | Rynkowski | |
| 2020/0147698 | A1 | 5/2020 | Buck | |
| 2020/0189009 | A1 * | 6/2020 | Matsuyama | B23P 15/28 |
| 2020/0222991 | A1 | 7/2020 | Adams | |
| 2020/0261984 | A1 | 8/2020 | Heckel | |
| 2020/0261986 | A1 | 8/2020 | Jaeger | |
| 2020/0261988 | A1 | 8/2020 | Hacker | |
| 2020/0290129 | A1 | 9/2020 | Heckel | |
| 2020/0316690 | A1 | 10/2020 | Ebert | |

FOREIGN PATENT DOCUMENTS

| | | | |
|---|---|---|---|
| DE | 3421902 | A1 | 12/1985 |
| DE | 4102975 | A1 | 8/1992 |
| DE | 202012009017 | U1 | 11/2012 |
| DE | 102012018436 | A1 | 3/2014 |
| DE | 102013226734 | A1 | 6/2015 |
| DE | 102017201404 | A1 | 8/2018 |
| DE | 102017205795 | A1 | 10/2018 |
| EP | 0395687 | A1 | 11/1990 |
| EP | 0445188 | A1 | 9/1991 |
| EP | 0485477 | A1 | 5/1992 |
| EP | 0537124 | A1 | 4/1993 |
| EP | 1767294 | A1 | 3/2007 |
| EP | 2354545 | A1 | 8/2011 |
| EP | 2644301 | A1 | 10/2013 |
| EP | 2708314 | A2 | 3/2014 |
| EP | 2871011 | A1 | 5/2015 |
| EP | 3141324 | A1 | 3/2017 |
| ES | 2002386 | A6 | 8/1988 |
| FR | 1318859 | A | 2/1963 |
| FR | 2001436 | A1 | 9/1969 |
| FR | 2325452 | A1 | 4/1977 |
| FR | 2356478 | A1 | 1/1978 |
| GB | 190322745 | A | 12/1903 |
| GB | 639035 | A | 6/1950 |
| GB | 901767 | A | 7/1962 |
| GB | 1460525 | A | 1/1977 |
| GB | 1539159 | A | 1/1979 |
| GB | 2211120 | A | 6/1989 |
| GB | 2247200 | A | 2/1992 |
| WO | 8903269 | A1 | 4/1989 |
| WO | 9006201 | A1 | 6/1990 |
| WO | 9101837 | A1 | 2/1991 |
| WO | 9104816 | A1 | 4/1991 |
| WO | 2006091438 | A1 | 8/2006 |
| WO | 2008092184 | A1 | 8/2008 |
| WO | 2010084346 | A1 | 7/2010 |
| WO | 2012011048 | A2 | 1/2012 |
| WO | 2012155180 | A1 | 11/2012 |
| WO | 2015197570 | A1 | 12/2015 |
| WO | 2018137909 | A1 | 8/2018 |
| WO | 2018184784 | A1 | 10/2018 |

OTHER PUBLICATIONS

Climax Portable Machining & Welding Systems, BB7100 Boring Machine Operating Manual, Nov. 2020.

Climax Portable Machining & Welding Systems, BB6100 Boring Bar Operating Manual, Oct. 2020.

Climax Portable Machining & Welding Systems, BB5500 Boring Machine Operating Manual, May 2019.

Climax Portable Machining & Welding Systems, BB4500-BB5000 Boring Machine Operating Manual, Feb. 2021.

Climax Portable Machining & Welding Systems, BB3000, Operating Manual, May 2019.

Climax Portable Machining & Welding Systems, BB500 line Boring Machine, https://www.climaxportable.com/products/line-boring-machines/bb5000-line-boring-machine/. Last accessed Jan. 22, 2025.

* cited by examiner

PORTABLE BORING MACHINE

CROSS REFERENCE TO RELATED APPLICATION

This application claims benefit of priority to U.S. Provisional Application No. 63/478,014, filed Dec. 30, 2022, which application is hereby incorporated by reference in its entirety.

FIELD

The present invention relates to a portable machine tool and, more particularly, to a portable line boring machine assembly.

SUMMARY

In one independent aspect, a feed assembly for a boring bar assembly may be provided. The boring bar assembly may include a rotatably drivable boring bar extending along a bar axis and a lead screw extending along a screw axis. The feed assembly may generally include a feed mechanism operable to move the bar along the bar axis as the bar rotates, the feed mechanism including a gear assembly selectively drivingly connectable between the bar and the lead screw, the gear mechanism including a forward gear and a reverse gear; and an adjustment mechanism operable to adjust a direction of movement of the bar along the bar axis, the adjustment mechanism including an actuator pivotable about an adjustment axis, the actuator being pivotable between a forward position, in which the forward gear is engaged to cause movement of the bar in a forward direction along the bar axis, and a reverse direction, in which the reverse gear is engaged to cause movement of the bar an opposite reverse direction along the bar axis.

In another independent aspect, an alignment device for a boring bar assembly may be provided. The assembly may include a rotatably drivable boring bar extending along an axis and having a circumference. The device may generally include a clamp connectable to the bar in an axial position along the bar; and an alignment member connectable to the clamp and having a conical surface engageable with a bore of a workpiece. One of the clamp and the alignment member may have a first portion and a separate second portion cooperating to define an opening to receive the bar, the first portion and the second portion being connectable about at least a portion of the circumference of the bar.

In yet another independent aspect, a boring bar assembly may generally include a boring bar extending along a bar axis; a drive unit including a drive unit housing, and a drive mechanism supported by the drive unit housing and operable to rotate the bar about the bar axis; a feed assembly configured to move the bar along the bar axis; a lead screw engageable with the feed assembly and defining a lead screw axis; and a clamp assembly configured to connect the lead screw and the drive unit housing, the clamp assembly including a first clamp member and a separate second clamp member cooperating to define an opening for receiving the lead screw, the first clamp member and the second clamp member being relatively movable between an engaged condition, in which the first clamp member and the second clamp member engage the lead screw to connect the lead screw to the drive unit housing, and a disengaged condition, in which at least one of the first clamp member and the second clamp member disengages the lead screw so that the lead screw and the drive unit housing are relatively movable along the lead screw axis.

In a further independent aspect, a boring bar assembly may generally include a boring bar extending along a bar axis; a drive unit operable to rotate the bar about the bar axis; a feed assembly configured to move the bar along the bar axis; a sensor configured to sense a characteristic indicative of a feed rate of the bar along the bar axis; an electronic controller configured to receive, from the sensor, a signal related to the sensed characteristic, and determine the feed rate; and an output device in communication with the controller and configured to provide an indication representative of the feed rate.

Other independent aspects of the invention may become apparent by consideration of the detailed description, claims and accompanying drawings.

DETAILED DISCLOSURE

Figure 1:
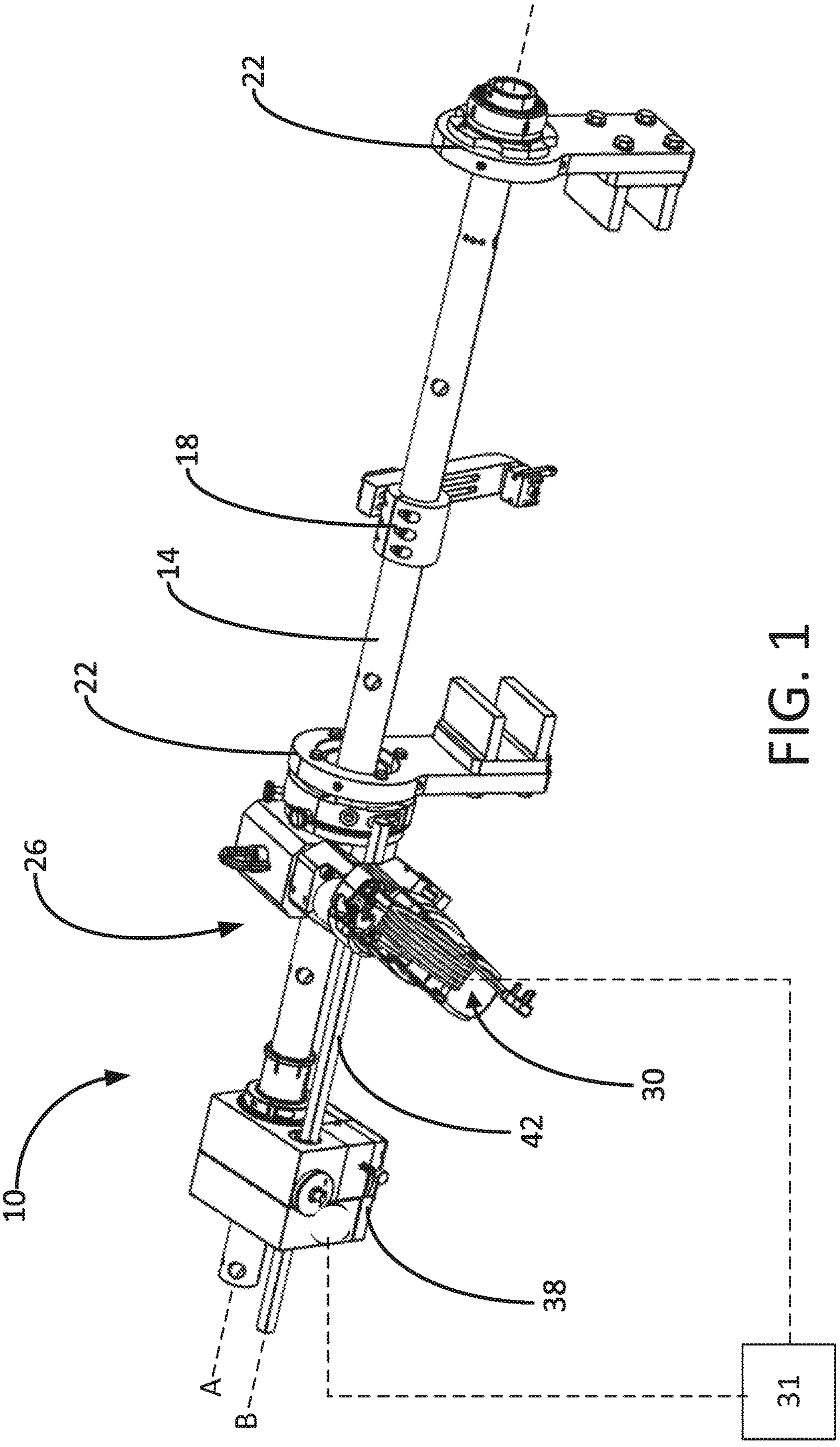
FIG. 1 is a perspective view of a portable boring assembly.

Before any independent embodiments are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

The embodiment(s) described below and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

FIG. 1 illustrates a portable boring assembly 10 operable to remove material from a bore (not shown) of a workpiece (not shown). The boring assembly 10 is operable to remove material from within the bore and from the face(s) of the workpiece proximate the bore and, in some cases, to add material to the workpiece with a bore welder (not shown). The boring assembly 10 is constructed to be easily portable and assembled on a work site.

The boring assembly 10 includes a boring bar 14 axially fitted through the bore(s) defined by a workpiece and a boring head assembly 18 fixedly coupled to the bar 14 for removing material within the bore(s) of the workpiece as the bar 14 rotates, reshaping the bore to a desired uniform diameter. The bar 14 extends along a central longitudinal axis A and is supported by spherical bearing mounts (not shown). The mounts are mounted to end support brackets 22 coupled to the workpiece adjacent the bores and are adjustable to align the bar 14 with a desired central axis of the bore of the workpiece.

A rotational drive unit 26 includes a motor 30 and a gear set 34 (see FIG. 4) which couples the bar 14 to the motor 30 to rotate the bar 14 when the motor 30 is activated. The drive unit 26 is secured to one of the mounts and one of the brackets 22 to inhibit axial and/or rotational motion of the drive unit 30. An axial feed assembly 38 converts rotation of the bar 14 into axial travel to move the bar 14 axially along a lead screw 42 and through the bore of the workpiece. For each revolution of the bar 14, the bar 14 and the head assembly 18 are moved a predetermined linear distance along the axis A through the bore of the workpiece. In the illustrated construction, the lead screw 42 is mounted to the rotational drive unit 26 via a re-positionable lead screw clamp 44 (see FIG. 3).

Figure 18:
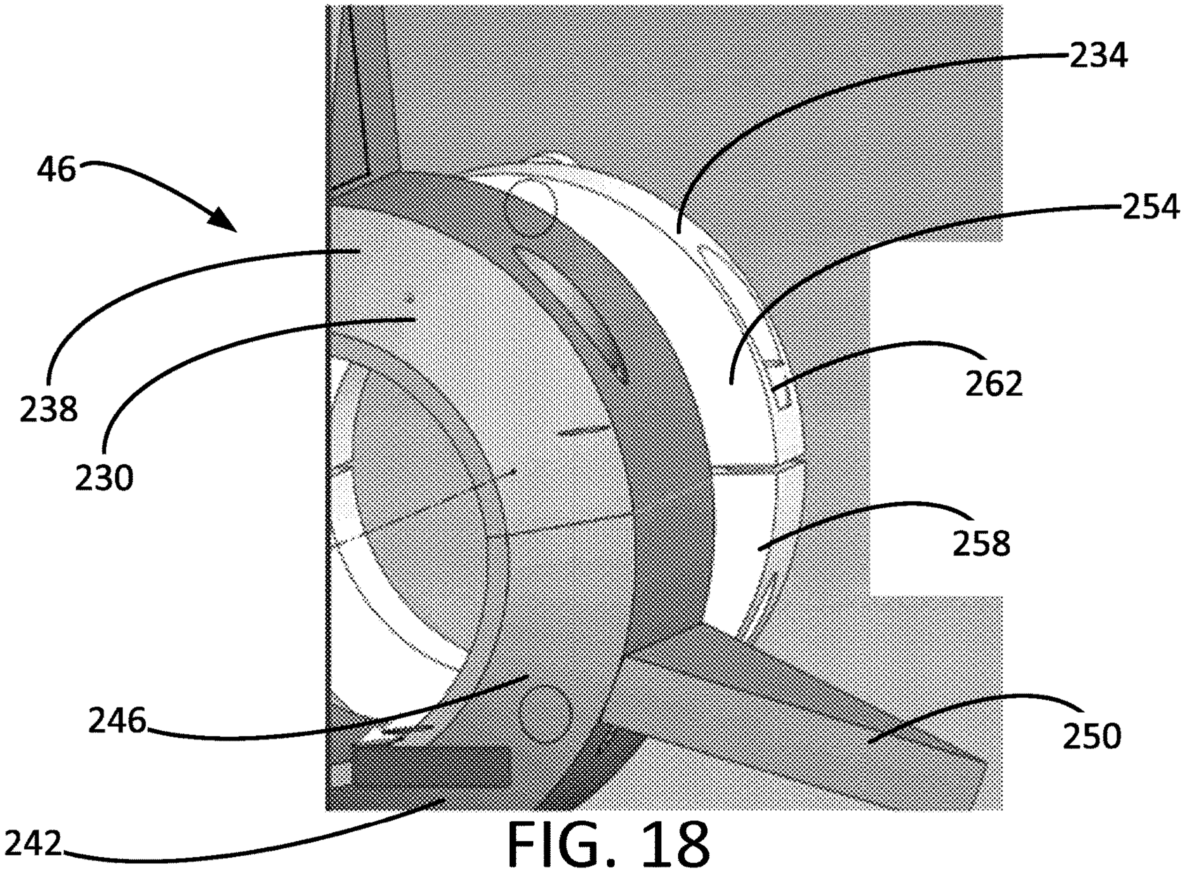
FIG. 18 is a perspective view of portion of an alignment cone assembly of the portable boring assembly of FIG. 1.
Figure 19:
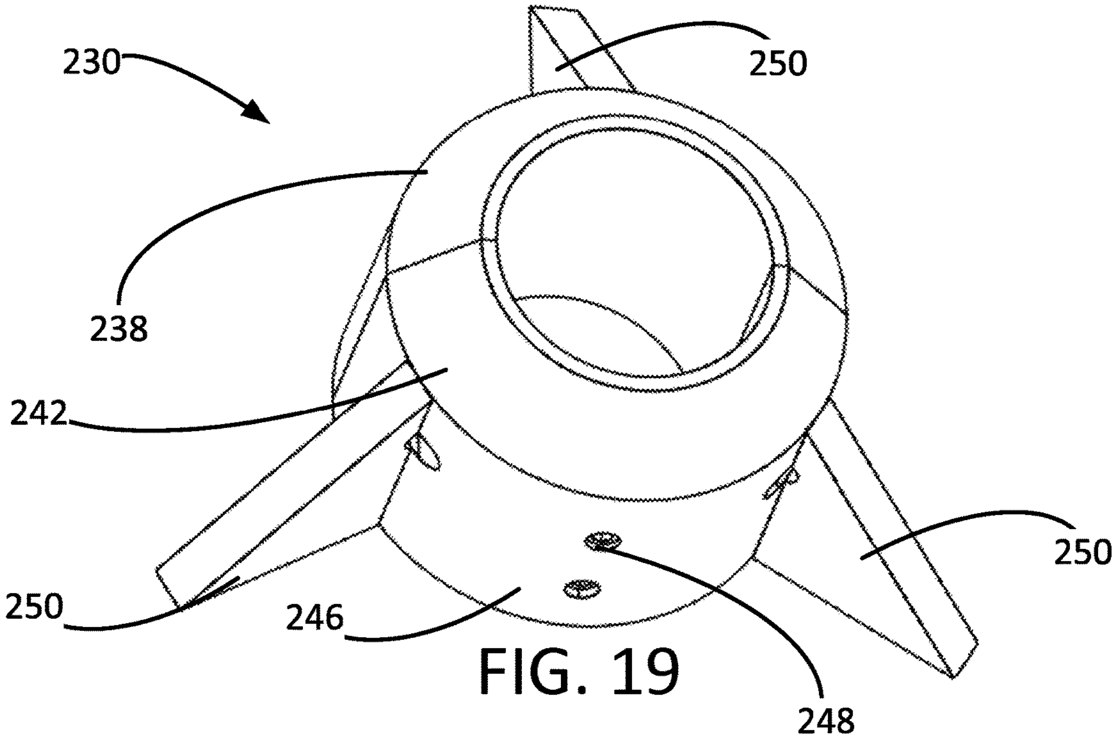
FIG. 19 is a perspective view of a cone member of the alignment cone assembly shown in FIG. 18.
Figure 20:
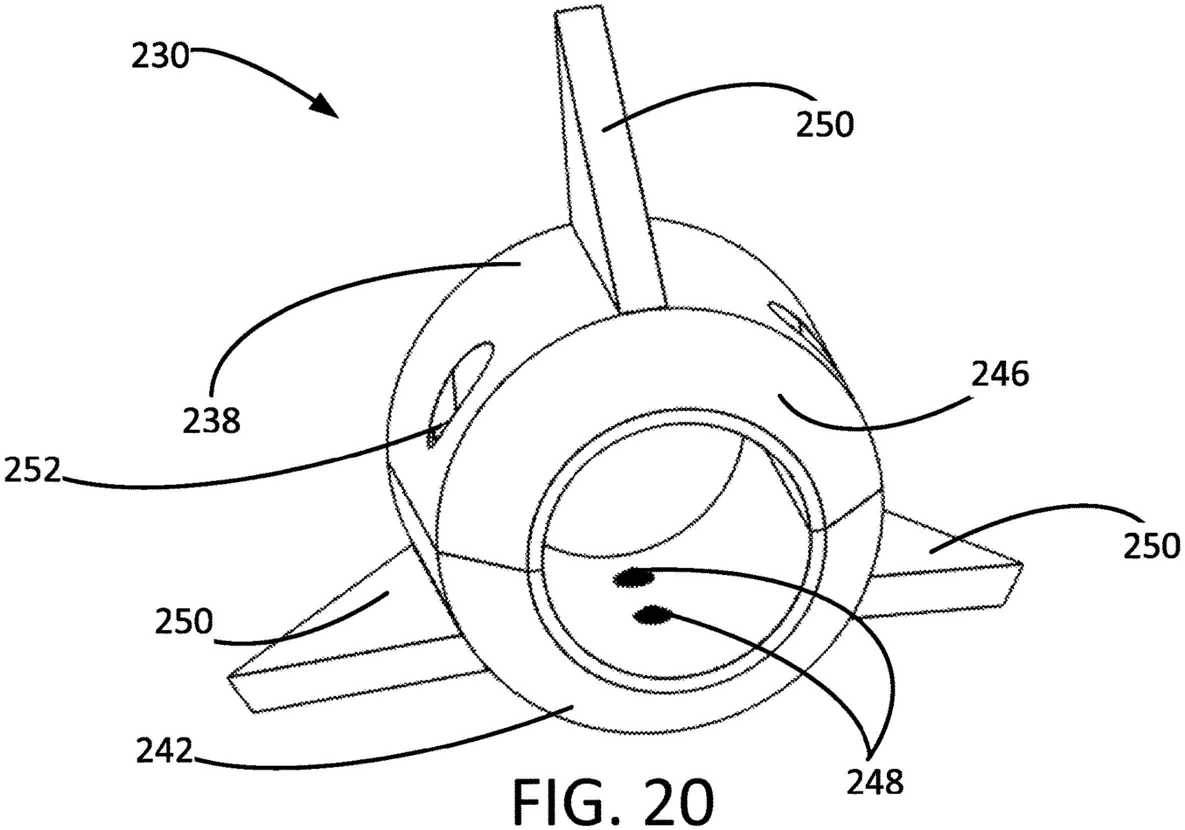
FIG. 20 is another perspective view of the cone member shown in FIG. 19.
Figure 21:
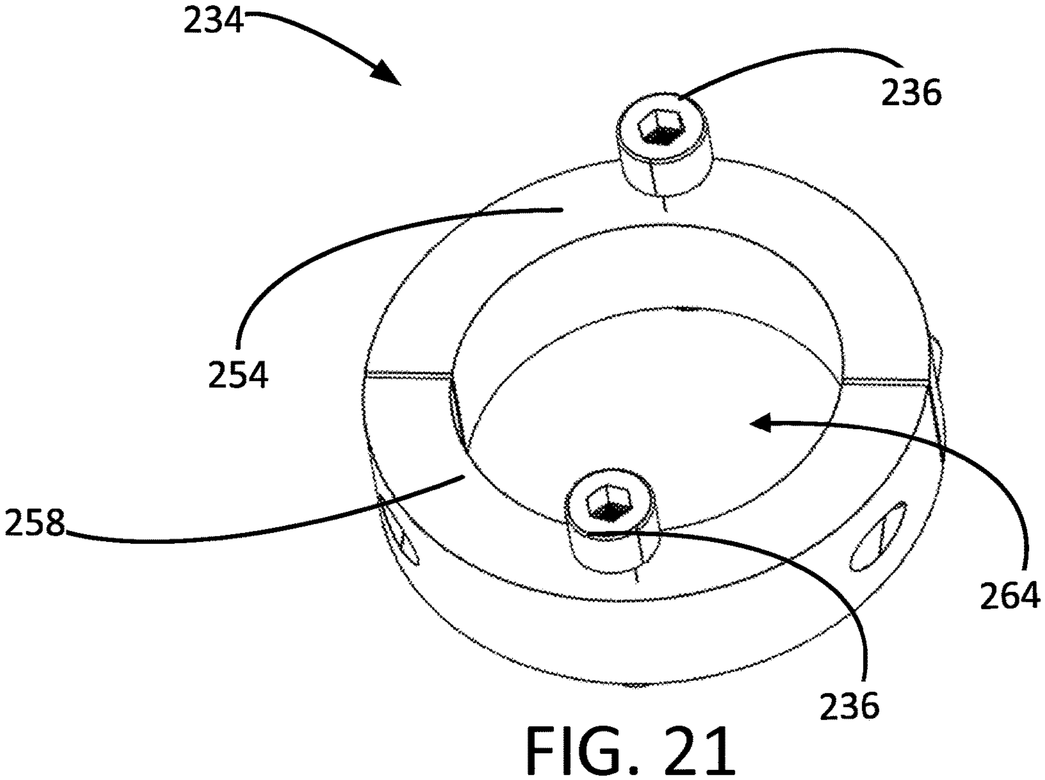
FIG. 21 is a perspective view of a locking clamp of the portable boring assembly of FIG. 1.
Figure 22:
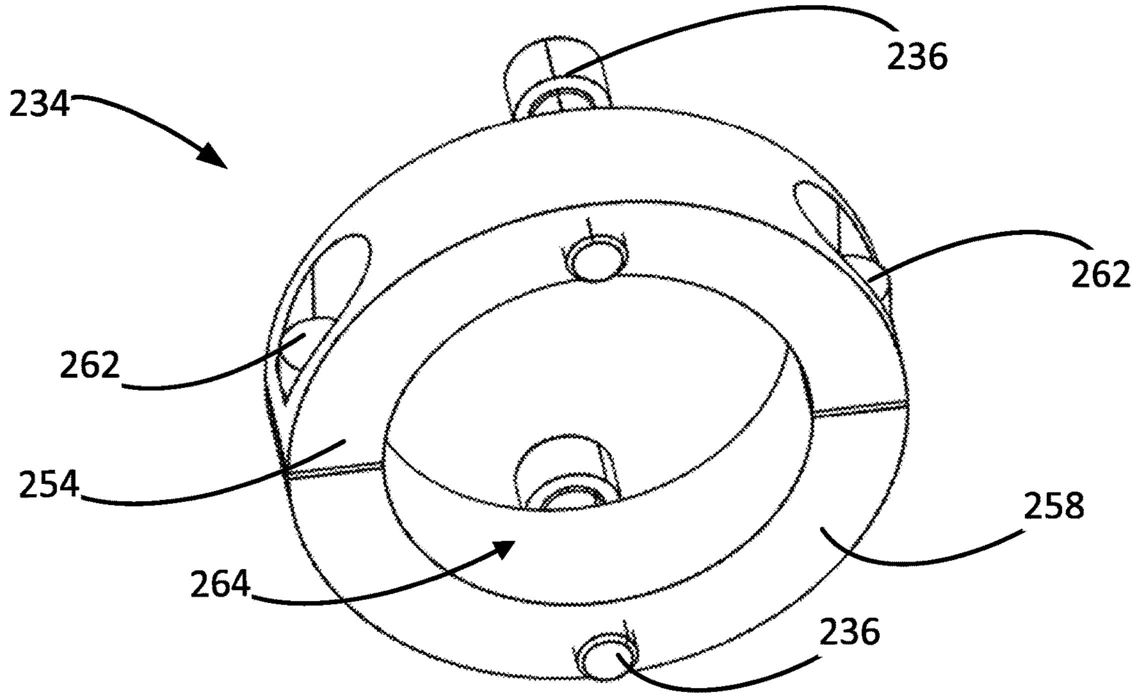
FIG. 22 is another perspective view of the locking clamp shown in FIG. 21.

At least one alignment cone assembly or set up cone assembly 46 (see FIG. 18) assists in aligning the axis A of the bar 14 with the desired axis of the bore of the workpiece. To set up the boring assembly 10 on the workpiece, the bar 14 and the boring head 18 are positioned within the bore of the workpiece, with opposite ends of the bar 14 supported by the mounts and the brackets 22. The cone assembly 46 is then used to align the axis A of the bar 14 with the desired axis of the bore. Once aligned, the brackets 22 are fixed in position to maintain alignment of the axis A of the bar 14 and the axis of the bore, and the cone assembly 46 is removed.

If the bore is worn or the bore is not uniform, a bore welder may be mounted to the support brackets 22 to perform a welding operation to add material to the bore. The bore welder may then be removed from the support brackets 22, and the portable boring assembly 10 may be supported by the support brackets 22 and operated to remove material from the bore as mentioned above to reshape the bore.

Rotational Drive Unit

FIGS. 2-5 illustrate the rotational drive unit 26 in more detail. The rotational drive unit 26 includes a housing 62 having a generally cylindrical housing portion 66. The cylindrical housing portion 66 defines a central axis which, as illustrated, is coaxial with the axis A of the bar 14. The housing 62 encloses the gear set 34 which is configured to transmit rotation from the motor 30 to a drive hub 70. The bar 14 is inserted through a boring bar opening of the drive hub 70 and is coupled to the drive hub 70 such that the bar 14 rotates with the drive hub 70.

Figure 4:
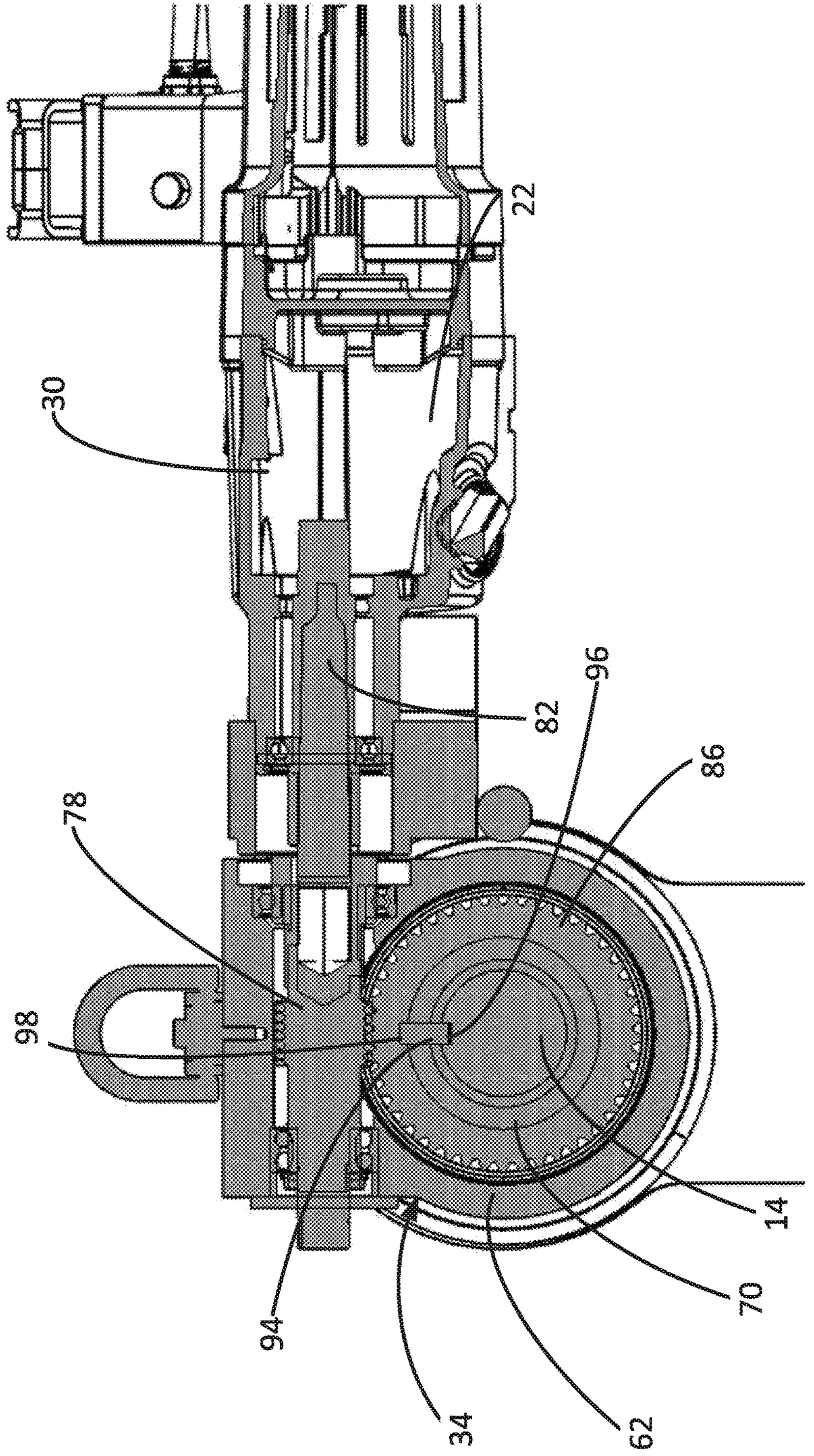
FIG. 4 is a cross-sectional end view of the portable boring assembly of FIG. 1.

As illustrated in FIG. 4, the gear set 34 is a double enveloping gear set. In other embodiments (not shown), the gear set 34 may be a different type of gear set, such as a single-enveloping gear set, a non-enveloping gear set, etc.

The illustrated gear set 34 includes a worm gear 78 arranged on an output shaft 82 of the motor 30 and a worm wheel 86 on the drive hub 70. A key 94 engages between a keyseat 96 of the bar 14 and a keyway 98 of the drive hub 70 to rotationally connect the bar 14 with the drive hub 70 and the worm wheel 86, while still allowing relative axial movement of the bar 14. Accordingly, when the motor 30 drives the worm gear 78, the worm gear 78 meshes with the worm wheel 86 which in turn rotates the drive hub 70 and the bar 14.

Referring back to FIG. 1, the illustrated motor 30 of the drive unit 26 is an electric motor. In other embodiments (not shown), the motor 30 may be a different type of motor such as a pneumatic motor, a hydraulic motor, etc. The motor 30 can be mounted on either side of the gear set 34.

In the illustrated embodiment, the motor 30 is coupled to a controller 31 via a wired or wireless connection. The controller 31 is configured to control operation of the boring assembly 10 and its components. The controller 31 includes an electronic processor (not shown) mounted on a printed circuit board (PCB; not shown).

The controller 31 is electrically and/or communicatively connected to a variety of modules or components of the boring assembly 10. The controller 31 includes a plurality of electrical and electronic components that provide power, operational control, and protection to the components and modules within the controller 31 and/or the boring assembly 10. For example, the controller 31 includes, among other things, the electronic processor (a programmable electronic microprocessor, microcontroller, or similar device), a memory (not shown), and an input/output (I/O) interface (not shown). The electronic processor is communicatively coupled to the memory and the I/O interface.

The controller 31 may be implemented in several independent controllers each configured to perform specific functions or sub-functions. Additionally, the controller 31 may contain sub-modules that include additional electronic processors, memory, or application specific integrated circuits (ASICs) for handling communication functions, processing of signals, and application of the methods listed below. In other embodiments, the controller 31 includes additional, fewer, or different components.

The memory is, for example, a non-transitory, machine-readable memory. The memory includes, for example, one or more non-transitory machine-readable media, a program storage area, and a data storage area. The program storage area and the data storage area can include combinations of different types of memory, such as read-only memory (ROM) and random access memory (RAM). In some embodiments, data is stored in a non-volatile random-access memory (NVRAM) of the memory. Various non-transitory computer readable media, for example, magnetic, optical, physical, or electronic memory may be used.

In the illustrated embodiment, the memory includes an input controller engine (not shown; for example, software or a set of computer-readable instructions that determines functions to be executed in response to inputs) and boring assembly functions (for example, software or a set of computer-readable instructions that provide functionality to the boring assembly 10).

The electronic processor is communicatively coupled to the memory and executes software instructions that are stored in the memory, or stored in another non-transitory computer readable medium such as another memory or a disc. The software may include one or more applications, program data, filters, rules, one or more program modules, and other executable instructions. In some embodiments, the memory stores predetermined functions, such as, for example, a calibration function (e.g., displaying options to a user and executing functionality to allow a user to calibrate the boring assembly 10) as well as other functions that are executed to provide boring assembly functionality, within the program storage area.

The I/O interface is communicatively coupled to components external to the controller 31 and coordinates the communication of information between the electronic processor and other components of the boring assembly 10. In illustrated examples, information received from an input component, an external device, etc. is provided to the electronic processor to assist in determining functions to be executed and outputs to be provided. The determined functionality is executed with the electronic processor with the software located the memory.

The controller 31 may be included in an external device (not shown; e.g., an external control device (a smart phone, a tablet, a computing device, a dedicated system control device, a pendant), a data collection device, a tool, etc.).

Such an external device may include a user input device (e.g., one or more buttons, keys, a touch screen, etc.) configured to receive one or more inputs (e.g., a selection, a command, etc.) from a user. The inputs to the external device are communicated to the controller 31 to execute selected boring assembly functions and/or operations (e.g., to turn the motor 30 on and off, to control the speed/rotational direction of the motor 30, to adjust the feed rate/direction, etc.).

The external device may include a user feedback or output device (e.g., a display) configured to display conditions or data associated with the boring assembly 10. The controller 31 communicates with and controls the output to the user (e.g., the condition(s) presented on the display). For example, the display may be configured to display, in real-time or substantially real-time, the motor speed and direction, the feed rate and direction, etc.

Figure 2:
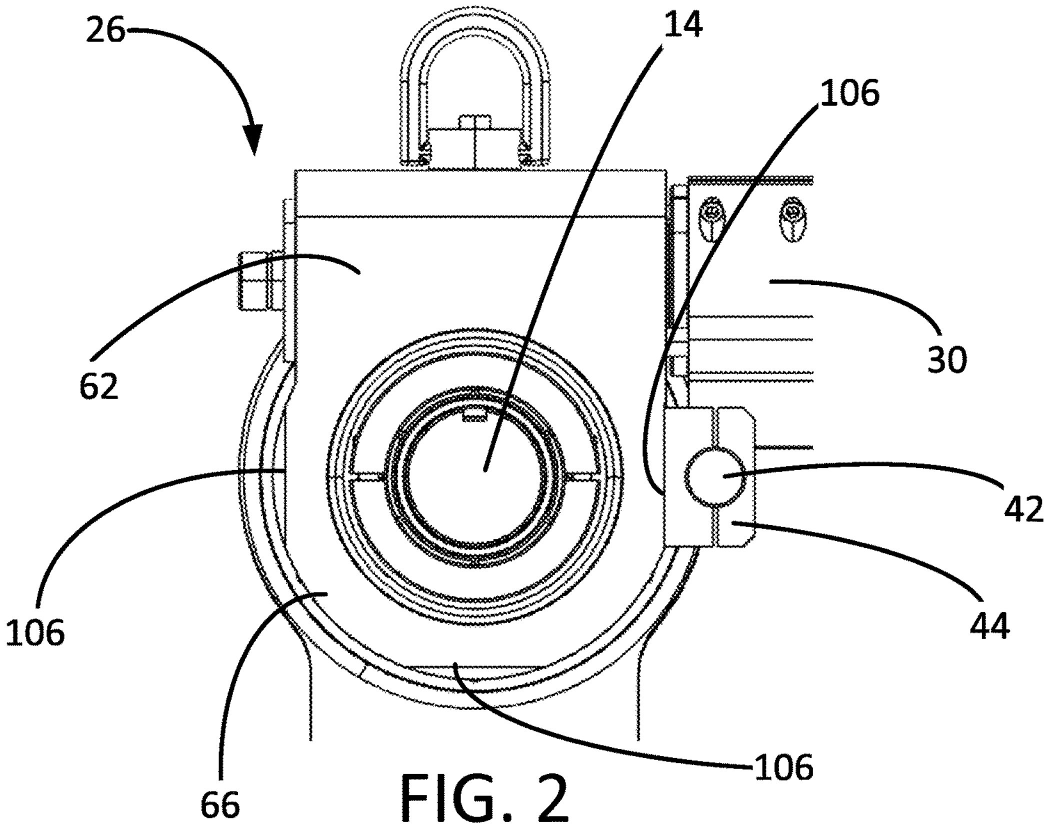
FIG. 2 is an end view of the portable boring assembly of FIG. 1 with an axial feed assembly removed.
Figure 3:
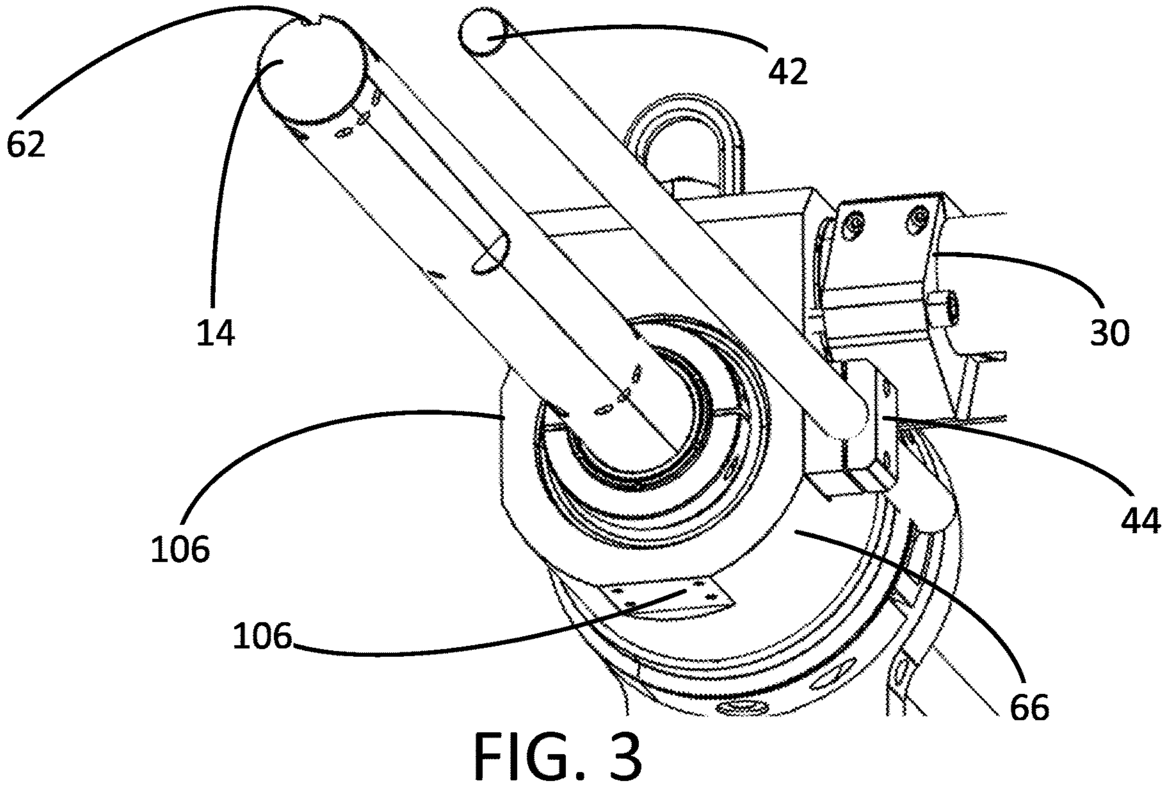
FIG. 3 is a bottom perspective view of the portable boring assembly of FIG. 1 with the axial feed assembly removed.
Figure 5:
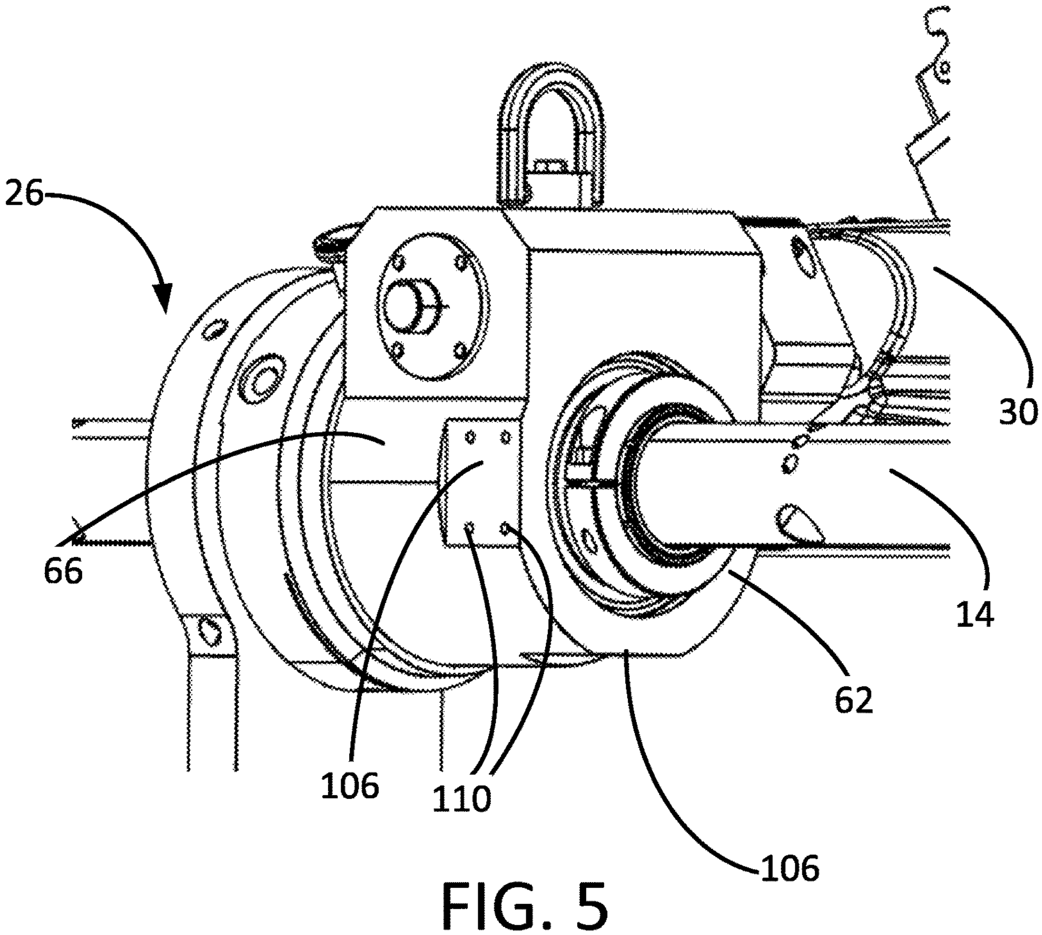
FIG. 5 is a side perspective view of the portable boring assembly of FIG. 1.

With reference to FIGS. 2-3 and 5, the housing 62 provides a plurality of mounting areas 106 (three, as illustrated). The illustrated mounting areas 106 are spaced 90 degrees from each other around the axis A of the boring bar 14 (e.g., at the 3, 6, and 9 o'clock positions) such that lead screw clamp 44 and the lead screw 42 can be positioned in different orientations to, for example, accommodate different positions of, obstacles to, and orientation of the boring bar 14. In other embodiments (not shown), the housing 62 may include more or fewer than the illustrated number of mounting areas 106.

Each mounting area 106 is configured to removably support the lead screw clamp 44 such that a user can selectively mount the clamp 44 to a selected one of the mounting areas. As illustrated, each mounting area 106 includes an associated recessed planar surface in the housing portion 66. A plurality of openings 110, each configured to receive a fastener, are provided on each surface 106.

Removable Lead Screw Clamp

Figure 6:
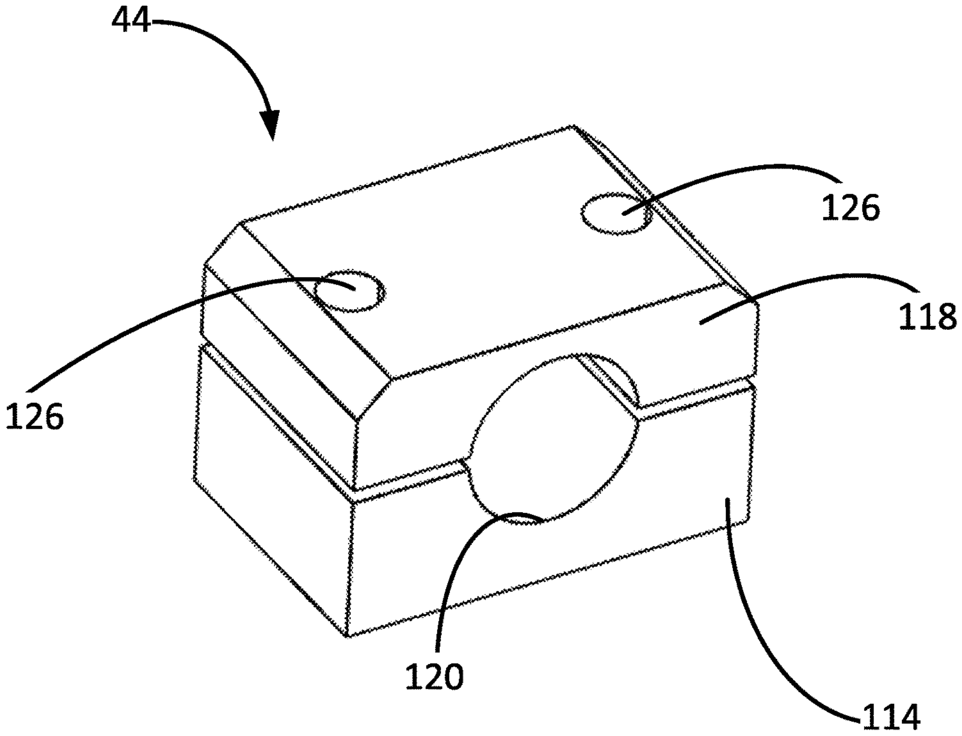
FIG. 6 is a perspective view of a lead screw clamp of the portable boring assembly of FIG. 1.
Figure 7:
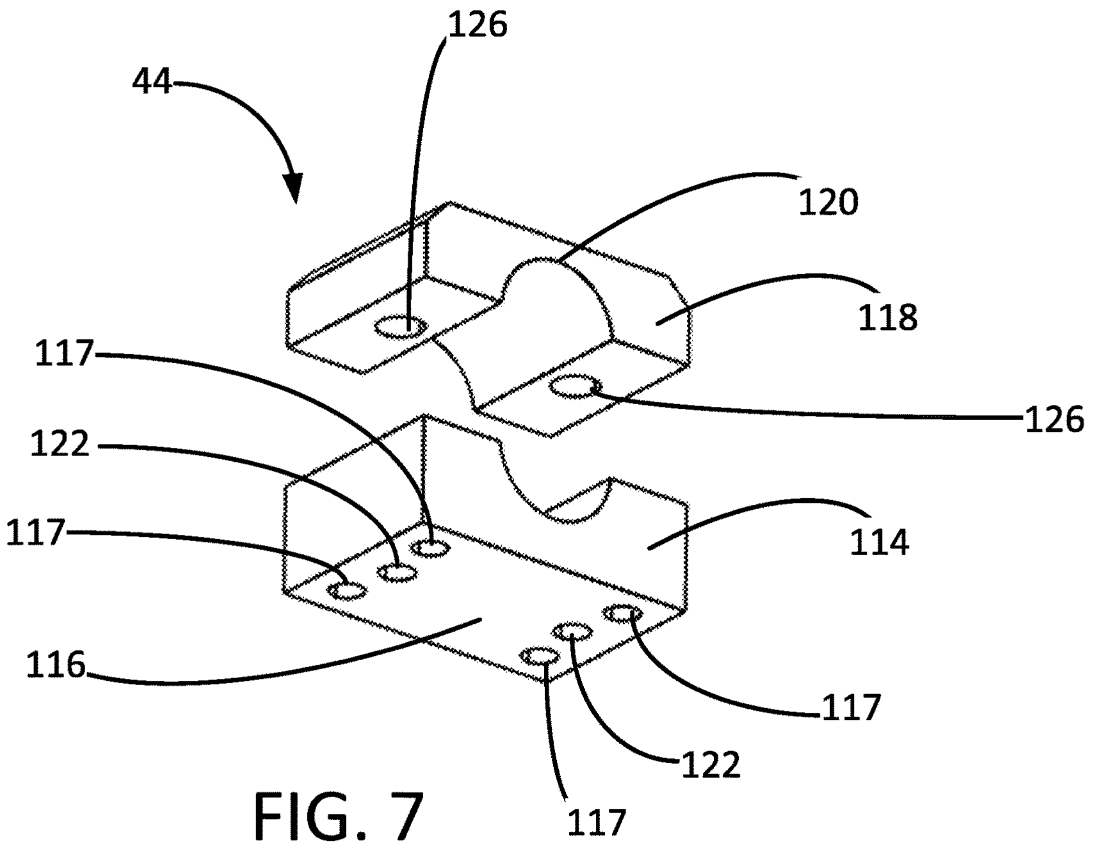
FIG. 7 is an exploded perspective view of the lead screw clamp of the portable boring assembly of FIG. 1.
Figure 8:
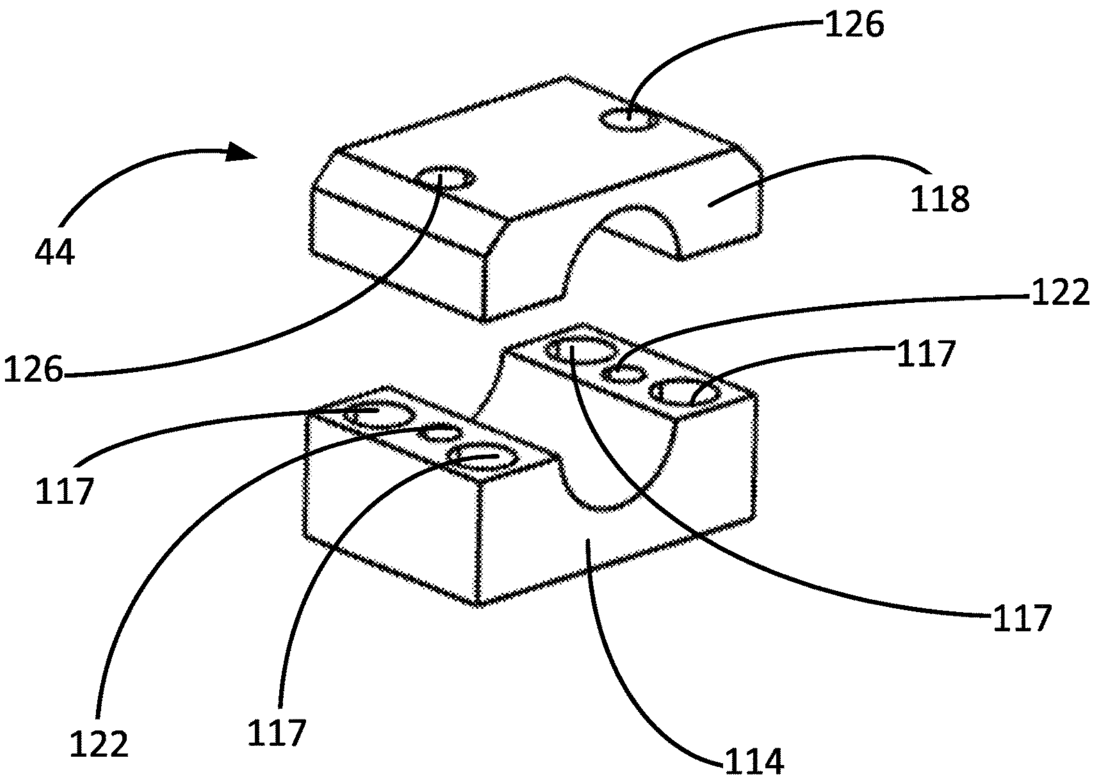
FIG. 8 is another view of the lead screw as shown in FIG. 7.
Figure 9:
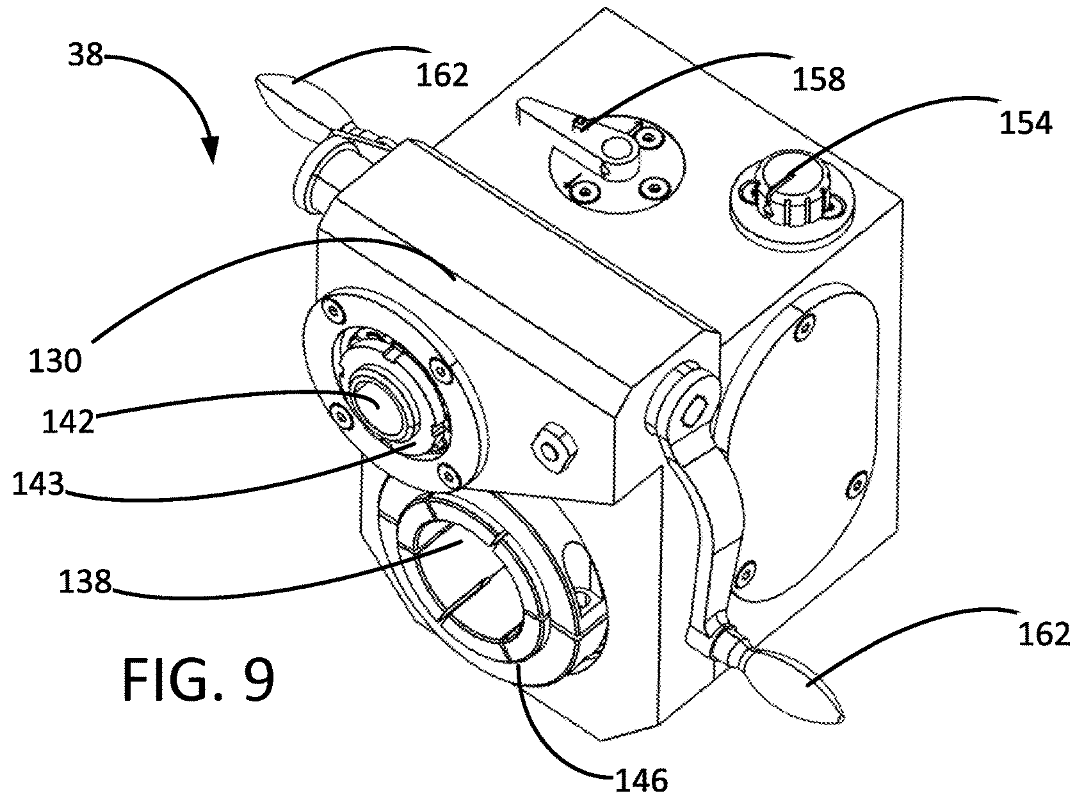
FIG. 9 is a perspective view of the axial feed assembly of the portable boring assembly of FIG. 1.
Figure 10:
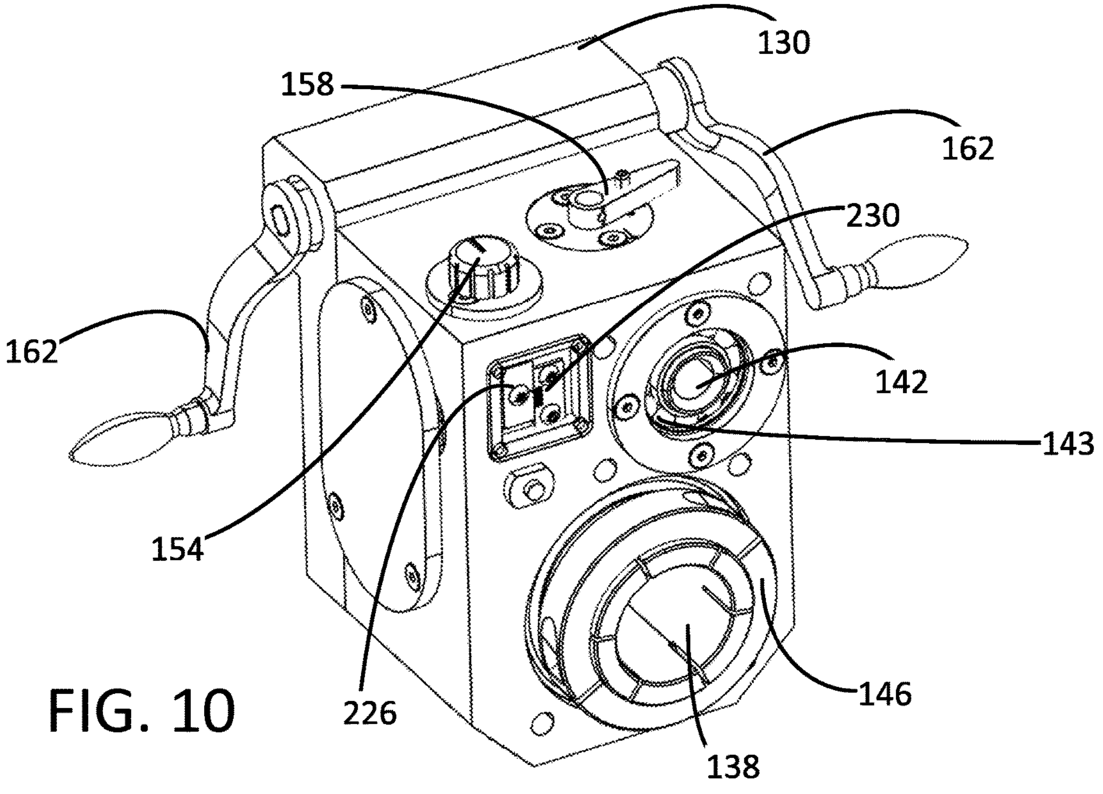
FIG. 10 is another perspective view of the axial feed assembly as shown in FIG. 9.

As illustrated in FIGS. 2-3, the lead screw clamp 44 is mounted on a selected one of the mounting areas 106. With reference to FIGS. 6-8, the clamp 44 includes separate first and second portions 114, 118 which cooperate to define a lead screw opening 120 to receive the lead screw 42. The lead screw opening 120 is centered on a longitudinal axis B of the lead screw 42. A plurality of springs (not shown) may be positioned between and bias the portions 114, 118 apart.

The first portion 114 has a planar surface 116 to abut the planar surface 106 of the selected mounting area 106. The first portion 114 defines a plurality of mounting holes 117 (four shown), and a mounting fastener (not shown) is installed through each mounting hole 117 into an aligned opening 110 in the planar surface 106 to mount the first portion 114 to the selected mounting area 106.

The first portion 114 also defines a plurality of clamping holes 122 (two shown) alignable with a corresponding number of clamping holes 126 of the second portion 118. Clamping fasteners (not shown) are installed into the clamping holes 122, 126 to releasably connect the portions 114, 118. The clamping fasteners are tightened so that the portions 114, 118 clamp onto the lead screw 42. When clamped, the lead screw 42 is held in place and is not movable axially or rotationally relative to the clamp 44 and to the housing 62. In some constructions (not shown), the clamping fasteners may include quick-clamp fasteners, such as ¼ fasteners, over-center cams, bayonets, etc., to quickly move between the clamped and unclamped positions.

To insert the lead screw 42 into the clamp 44, the clamping fasteners are loosened to expand the opening 120, and the user inserts the lead screw 42. Alternatively, the second portion 118 may be separated from the first portion 114 so that the clamp 44 can be installed at an intermediate portion of the lead screw 42 without requiring insertion of the lead screw 44 through the opening 120 to that position. After positioning, the clamping fasteners are tightened to hold the lead screw 42. To remove the lead screw 42 from the clamp 44 or to move the lead screw 42 relative to the clamp 44, the clamping fasteners are loosened, and the spring(s), if provided, push the portions 114, 118 apart, enlarging the opening 120 and disengaging the lead screw 42. With the clamp 44, the lead screw 42 can be inserted/moved/removed without needing to be screwed in/out Axial Feed Assembly FIGS. 9-17 illustrate the axial feed assembly 38. The axial feed assembly 38 includes a housing 130 and a gear set 134 (see FIG. 11) disposed in the housing 130. The gear set 134 is configured to transmit rotation of the boring bar 14 to the lead screw 42. The axial feed assembly 38 additionally includes a cam hub 138, or boring bar hub, receiving the boring bar 14 and a lead screw nut 142 receiving the lead screw 42.

The cam hub 138 is mounted in the housing 130 via bearings 139 (see FIG. 11) to be rotatable in the housing 130. The cam hub 138 is centered on the axis A of the boring bar 14. The cam hub 138 is clamped onto the boring bar 14 via locking clamps 146 such that axial movement of the axial feed assembly 38 causes axial movement of the boring bar 14.

The lead screw nut 142 is mounted in the housing 130 via bearings 143 to be rotatable in the housing 130. The lead screw nut 142 is centered on the axis B of the lead screw 42. The lead screw nut 142 is threaded onto and movable axially along the lead screw 42 via rotation of the lead screw nut 142. The lead screw nut 142 is secured to the housing 130 via a lock nut 143 such that the axial feed assembly 38 is axially movable along the lead screw 42 with the lead screw nut 142.

The axial feed assembly 38 also includes an actuator (e.g., a single dial 154) for adjustment of the axial feed rate, a pivoting lever 158 for adjustment of the axial feed direction, and manual handles 162 for manual axial movement of the boring bar 14. The dial 154, the pivoting lever 158 and the manual handles 162 are mounted at a top of the housing 130. The axial feed rate increases when the dial 154 is rotated in one direction and decreases when the dial 154 is rotated in the opposite direction. The increase and decrease is consistent whether the boring assembly 10 is in forward or reverse condition, as set by the pivoting lever 158.

The pivoting lever 158 is pivoted to shift the axial feed assembly 38 between a forward condition, a reverse condition, and a neutral condition. In the forward condition, the boring bar 14 and the axial feed assembly 38 move in a forward direction (e.g., towards the workpiece) in response to rotation of the boring bar 14. In the reverse condition, the boring bar 14 and the axial feed assembly 38 move in the opposite rearward direction (e.g., away from the workpiece) in response to rotation of the boring bar 14. In the neutral condition, the boring bar 14 and the axial feed assembly 38 do not move when the boring bar 14 is rotated.

With reference to FIGS. 11-14, the manual handles 162 are configured as cranks and are mounted on a common manual shaft 166. In some embodiments (not shown), the axial feed assembly 38 may only include one manual handle 162. The gear set 134 includes a first manual gear 170 and a second manual gear 174.

The illustrated first manual gear 170 includes a helical gear fixed on the manual shaft 166, and rotation of the manual handles 162 results in rotation of the first manual gear 170. In some embodiments (not shown), the first manual gear 170 may include a different type of gear, such as a worm gear. The second manual gear 174 is fixed on the lead screw nut 142, and rotation of the second manual gear 174 causes rotation of the lead screw nut 142. The second manual gear 172 meshes with the first manual gear 170 to transmit rotation of the manual handles 162 to the lead screw nut 142.

In the neutral condition, rotation of either manual handle 162 causes the boring bar 14 to move in the forward direction or in the backward direction. The manual handles 162 are independent from the dial 154 and the pivoting lever 158. Accordingly, rotation of the boring bar 14 does not cause rotation of the manual handles 162, and, likewise, rotation of either manual handle 162 does not cause movement of the boring bar 14 when the axial feed assembly 38 is in the forward condition or reverse condition.

Figure 14:
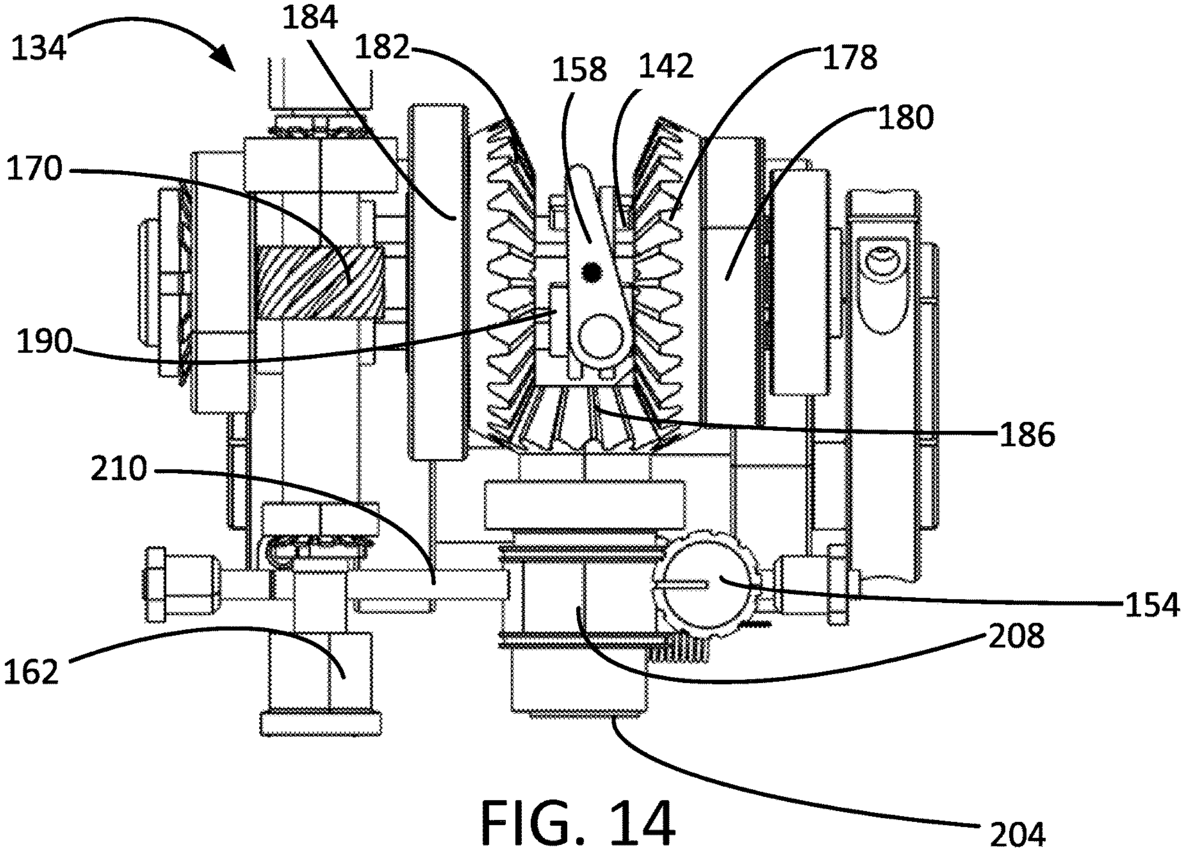
FIG. 14 is a top view of the axial feed assembly as shown in FIG. 11.
Figure 15:
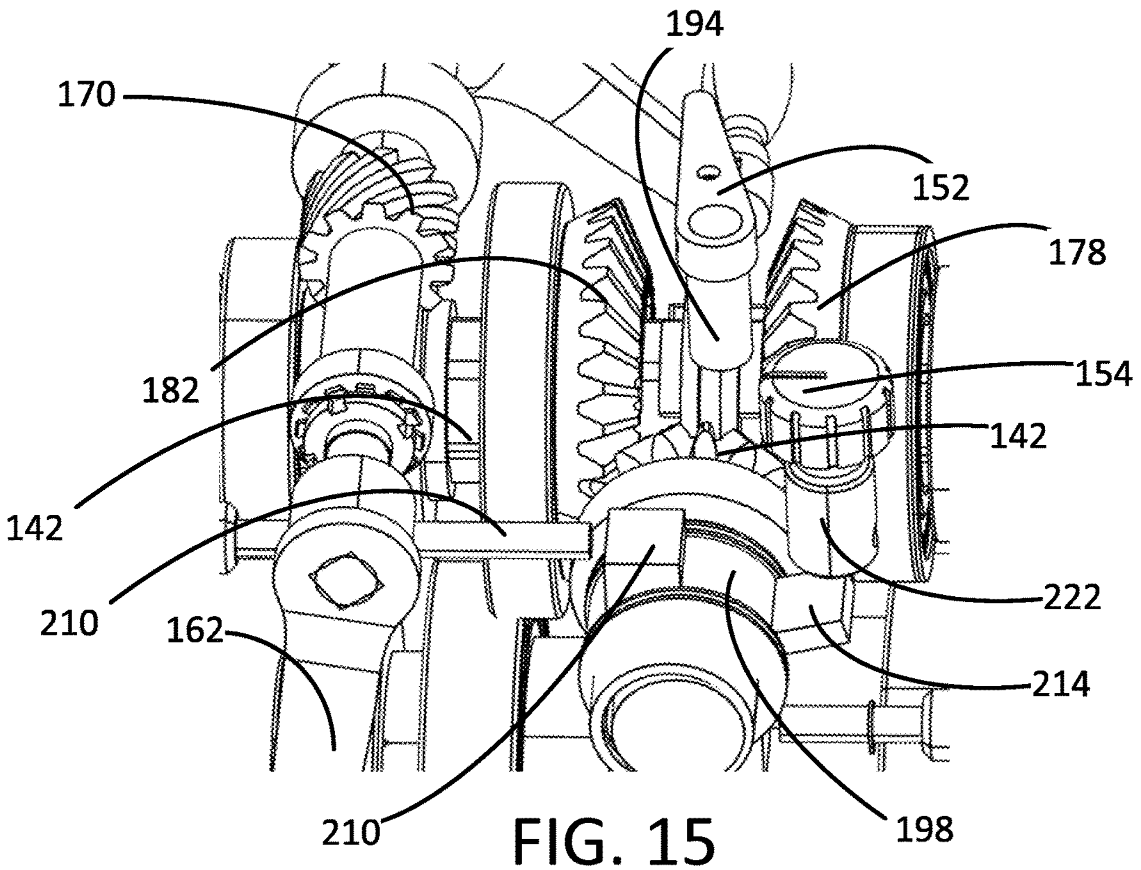
FIG. 15 is an enlarged perspective view of the axial feed assembly as shown in FIG. 13.
Figure 16:
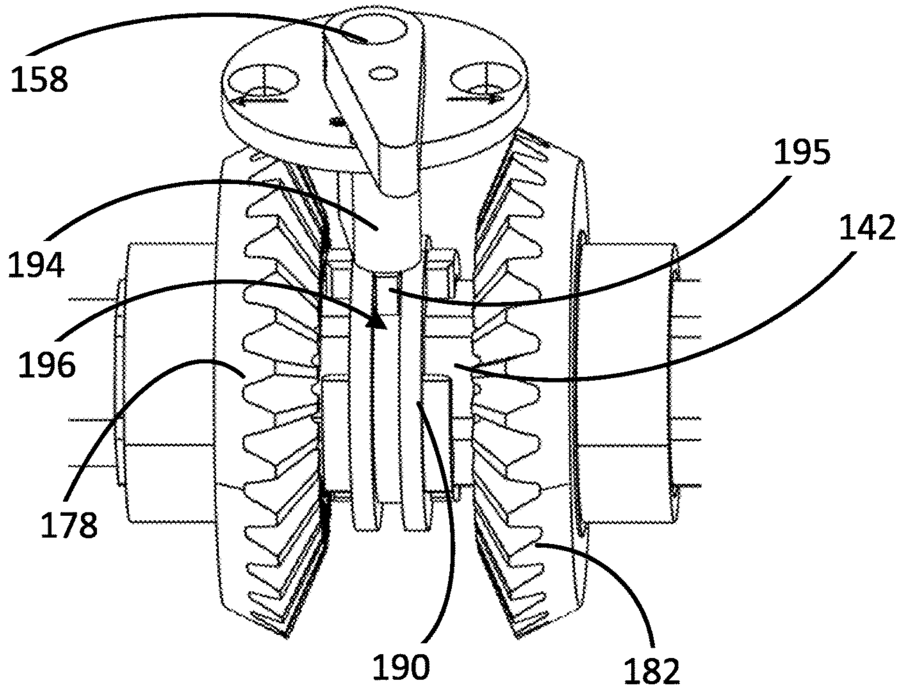
FIG. 16 is an enlarged perspective view of a shifting assembly of the axial feed assembly as shown in FIG. 11.
Figure 17:
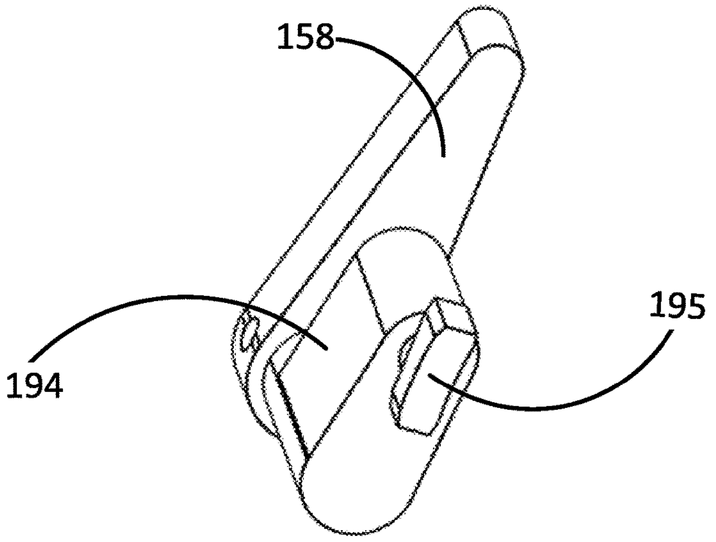
FIG. 17 is a perspective view of a shifter of the shifting assembly shown in FIG. 16.

With reference to FIGS. 14-15, the gear set 134 includes a first output gear 178, a second output gear 182 and a pinion 186. In the illustrated embodiment, the first output gear 178, the second output gear 182 and the pinion 186 are bevel gears. In other embodiments (not shown), the first output gear 178 and the second output gear 182 may be another type of gear such as spur gears, and, instead of the pinion 186, a lay shaft having a plurality of gears may drive the first output gear 178 and the second output gear.

The first output gear 178 and the second output gear 182 are mounted on the lead screw nut 142 via respective bearings 180, 184. The first output gear 178 and the second output gear 182 are positioned on opposite sides of the pinion 186 such that the output gears 178, 182 rotate in opposite directions. The pinion 186 meshes with both the first output gear 178 and the second output gear 182 such that torque from the pinion 186 is transmitted to both output gears 178, 182.

A hex collar 190 is positioned on the lead screw nut 142 between the output gears 178, 182. The hex collar 190 is secured on the lead screw nut 142 to transmit torque to the lead screw nut 142. The hex collar 190 is axially movable on the lead screw nut 42 between different collar positions between the output gears 178, 182.

As illustrated, the pivoting lever 158 is coupled to a shifter arm 194, and the shifter arm 194 is coupled, via a shifter pin 195, to the hex collar 190. The illustrated shifter pin 195 is generally rectangular and sits in a groove 196 defined in the outer surface of the hex collar 190 and extending transverse to the axis B. The shifting pin 195 is pivotably coupled to the shifter arm 194. The pivoting lever 158 is configured to move the hex collar 190 between the collar positions, and, as the pivoting lever 158 and the shifter arm 194 pivot, the shifter pin 195 remains in the groove 196, aligned transverse to the axis B. The side walls of the shifter pin 195 engage the respective side walls of the groove 196 to covert pivoting movement of the pivoting lever 158 and the shifter arm 194 to sliding movement of the hex collar 190 between the collar positions.

When the pivoting lever 158 is pivoted to the forward position, the shifter pin 195 moves the hex collar 190 to the forward collar position to engage the first output gear 178, and the hex collar 190 transmits the torque from the first output gear 178 to the lead screw nut 142. In the forward collar position, the lead screw nut 142 is rotated in a first rotational direction such that the lead screw nut 142 and, thus, the axial feed assembly 38 move in the forward direction.

When the pivoting lever 158 is pivoted to the rearward position, the shifter pin 195 moves the hex collar 190 to the rearward collar position to engage the second output gear 182, and the hex collar 190 transmits the torque from the second output gear 182 to the lead screw nut 142. In the rearward collar position, the lead screw nut 142 is rotated in a second opposite rotational direction such that the lead screw nut 142 and, thus, the axial feed assembly 38 move in the rearward direction.

When the pivoting lever 158 is pivoted to the neutral position, the shifter pin 195 moves the hex collar 190 to the neutral collar position in which the hex collar 190 is spaced from and does not engage either output gear 178, 182. As a result, in the neutral position, no torque is transferred to the lead screw nut 142 from the first output gear 172 or from the second output gear 182.

Figure 11:
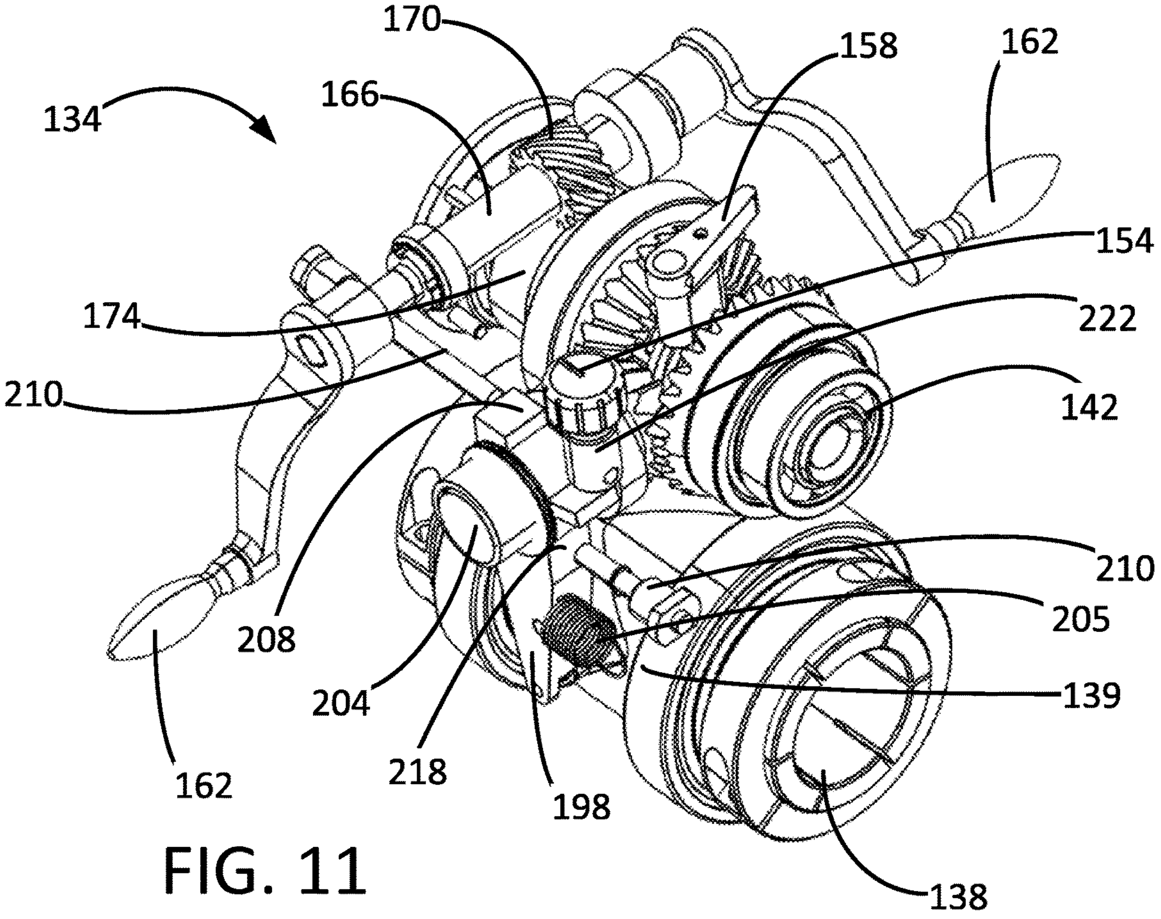
FIG. 11 is a perspective view of the axial feed assembly shown in FIG. 10, illustrated with a housing of the axial feed assembly removed.
Figure 12:
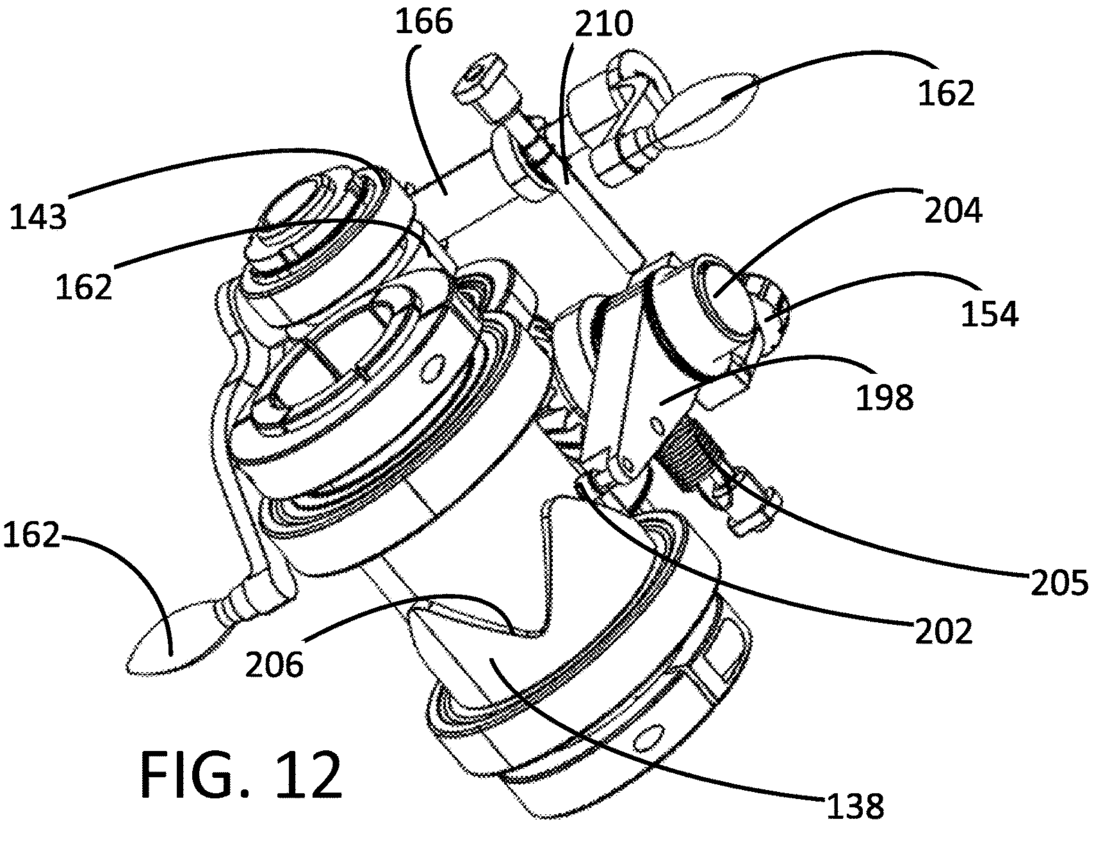
FIG. 12 is another perspective view of the axial feed assembly as shown in FIG. 11.
Figure 13:
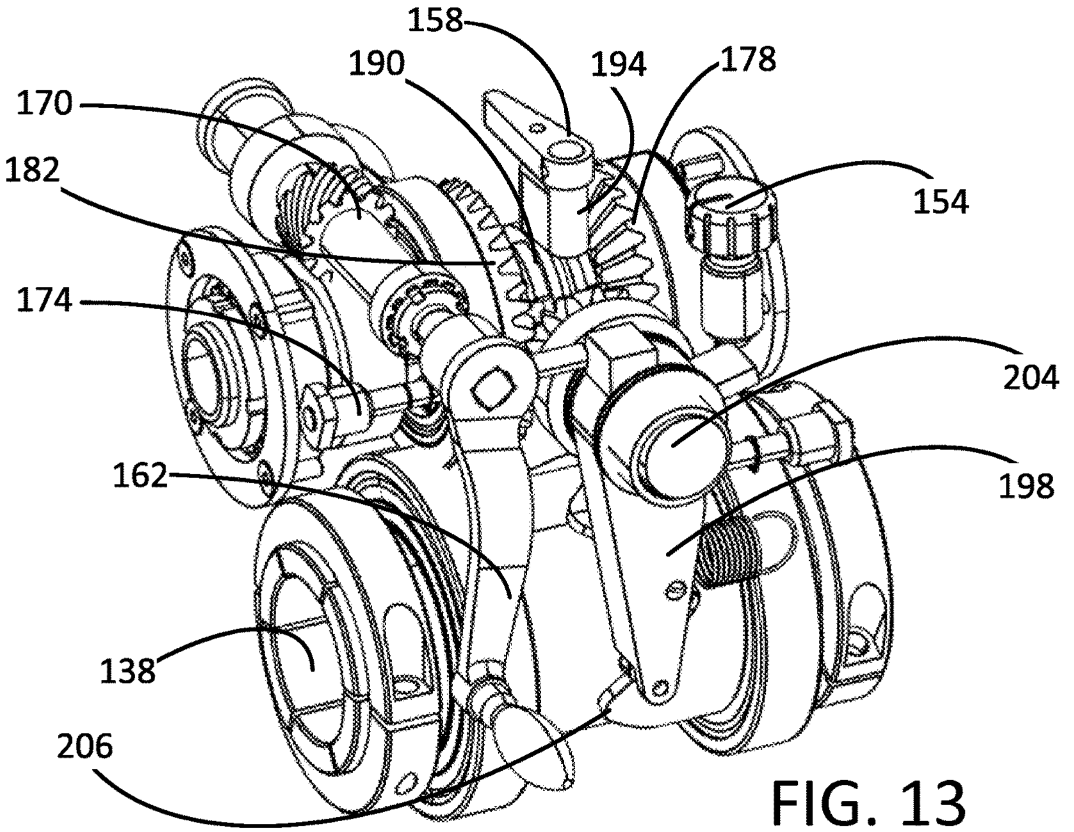
FIG. 13 is yet another perspective view of the axial feed assembly as shown in FIG. 11.

With reference to FIGS. 11-13, the axial feed assembly 38 further includes a rocker 198 coupled to a cam follower 202, a shaft 204 on which the rocker 198 is mounted, and a spring 205 coupled to the housing 130 and the rocker 198. The rocker 198 is coupled to the shaft 204 via one-way bearings such that only torque resulting from pivoting of the rocker 198 in a first direction, and not in an opposite second direction, is transmitted to the shaft 204. The shaft 204 is elongated in a direction perpendicular to the axis A. The shaft 204 is coupled directly to the pinion 186 such that rotation of the shaft 204 is transmitted to the pinion 186.

The cam hub 138 defines a cam surface 206 which contacts and moves the cam follower 202. In the illustrated embodiment, the cam surface 206 extends around a circumference and outwardly in a radial direction of the cam hub 138. The cam surface 206 substantially extends along a wave wrapped around the axis A of the boring bar 14. The spring 205 biases the rocker 198 toward the cam surface 206 such that the cam follower 198 makes continuous contact with the rocker 198. Due to the wave shape of the cam surface 206, the rocker 198 pivots on the shaft 204 and transmit rotation of the cam surface 206 to the shaft 204, and, thus, the pinion 186. In other words, the axial feed assembly 38 transmits rotation from the boring bar 14 in the cam hub 138 to rotation of the lead screw nut 142. Accordingly, rotation of the boring bar 14 creates axial movement of the axial feed assembly 38 and thus, axial movement of the boring bar 14.

With reference to FIGS. 11 and 15, the rocker 198 includes a stop projection 210, an axial feed projection 214, and a stop surface 218. The axial feed projection 214 extends in a radial direction of the shaft 204. Stop pins 210 are mounted on the housing 130 and limit the pivoting range of the rocker 198.

The dial 154 screws an axial feed gauge 222 toward and away from rocker 198 to reduce and enlarge the range of motion of the rocker 198. Specifically, the axial feed gauge 222 is moved toward the axial feed projection 214 to reduce the range of motion of the rocker 198. When the range of motion of the rocker 198 is reduced, less torque is transmitted from the boring bar 14 to the lead screw nut 142, and the axial feed rate is reduced. When the axial feed gauge 222 is moved away from the axial feed projection 214, the range of motion of the rocker 198 is enlarged, more torque is transmitted from the boring bar 14 to the lead screw nut 142, and the axial feed rate is increased.

In the illustrated embodiment, the axial feed gage 222 is coupled to a feed rate indicator 226. The feed rate indicator 226 moves linearly with the axial feed gauge 222 and relative to a fixed control bracket 230. The position of the indicator 226 relative to the control bracket 230 indicates to a user the feed rate of the boring bar 14.

In some embodiments, the axial feed assembly 38 may electronically indicate the information to the user. The axial feed assembly 38 may include a user feedback or output device (e.g., a display) configured to display conditions or data (e.g., the feed rate, the feed direction, etc.). The feed assembly display may be located on the housing 130 of the axial feed assembly 38 (e.g., in place of the indicator 226 and the control bracket 230). Alternatively or additionally, as mentioned above, conditions or data representative of the axial feed assembly 38 may be communicated to the user on a display of an external device.

The axial feed assembly 38 includes a sensor arrangement (not shown; for example, digital encoders) configured to sense operational characteristics of the boring assembly 10. For example, one sensor may sense the rotational speed of the boring bar 14 (e.g., measured in rpm). Another sensor may sense characteristics indicative of the feed rate and/or direction of movement along the lead screw nut 42 (e.g., a rotational speed/direction of the lead screw nut 142 (measured in mm/s)). Based on at least the signals, the controller 31 can determine rotational speed of the boring bar 14, an axial feed rate/direction, etc., and control the display to communicate this information to the user.

Alignment Cone Assembly

FIGS. 18-22 illustrate the cone assembly 46 which is configured to align the axis A of the bar 14 with the desired center of the bore(s) of the workpiece. The illustrated cone assembly 46 is a split cone assembly which enables the cone assembly 46 to be positioned on and removed from the boring bar 14 radially, rather than being slid along the length of the bar 14. The cone assembly 46 includes a cone member 230 and a locking clamp 234 coupled to the cone member 230 via fasteners 236.

The cone member 230 is a split cone member and includes removably coupled first and second cone member portions 238, 242 which, together, define an annular sleeve 246 configured to receive the boring bar 14. The cone member portions 238, 242 include a plurality of fins 250 extending radially from the sleeve 246 for engagement with the workpiece. Each illustrated fin 250 has a triangular cross-section.

The cone member portions 238, 242 are secured via fasteners 252 extending through the sleeve 246. One cone member portion (e.g., the first cone member portion 238) defines a passage for receiving the body and head of each fastener 252 and the other cone member portion (e.g., the second cone member portion 242) defines a threaded opening for threadedly receiving each fastener 252. One cone member portion (e.g., the second cone member portion 242) defines threaded openings into the sleeve 246 to threadedly receive set screws 248 and limit movement of the cone member 230 along the boring bar 14.

The locking clamp 234 clamps the cone member 230 to the boring bar 14. The locking clamp 234 is a split locking clamp and, with reference to FIGS. 21-22, includes first and second clamp portions 254, 258 selectively couplable via fasteners 262. The locking clamp 234 is substantially annular, defining an opening 264 to receive the boring bar 14.

To align the boring bar 14 with the bore of the workpiece, the cone member portions 238, 242 and the clamp portions 254, 258 are separated. The cone member portions 238, 242 are moved radially onto the boring bar 14 and secured about the boring bar 14 by installing and tightening the fasteners 252. The clamp portions 254, 258 are moved radially onto the boring bar 14 and secured about the boring bar 14 with the fasteners 262. The locking clamp 234 is then secured to the cone member 230 via the fasteners 236. The locking clamp 234 is then tightened on the boring bar 14 by further tightening the fasteners 262 to clamp the cone member 230 on the boring bar 14.

The boring bar 14 is then positioned in the bore of the workpiece with the fins 250 of the cone member 230 abutting the workpiece to align the axis A with the bore of the workpiece. The boring bar 14 is secured in this aligned position in the end support brackets 22 which are fixed to the workpiece. After the boring bar 14 is positioned, the locking clamp 234 is loosened on the bar 14 and separated from the cone member 230, and the cone member portions 238, 242 and the clamp portions 254, 258 are separated and radially removed from the boring bar 14. The boring bar 14 does not need to be removed from the support brackets 22 to remove the cone assembly 46.

In the illustrated embodiment, each illustrated cone member portion 238, 242 and clamp portion 254, 258 is substantially semi-annular. In other embodiments (not shown), the cone assembly 46 may have a different number of cone member portions and/or clamp portions and/or portions with a different angular extent (e.g., three portions, each having a 120° extent).

Figure 23:
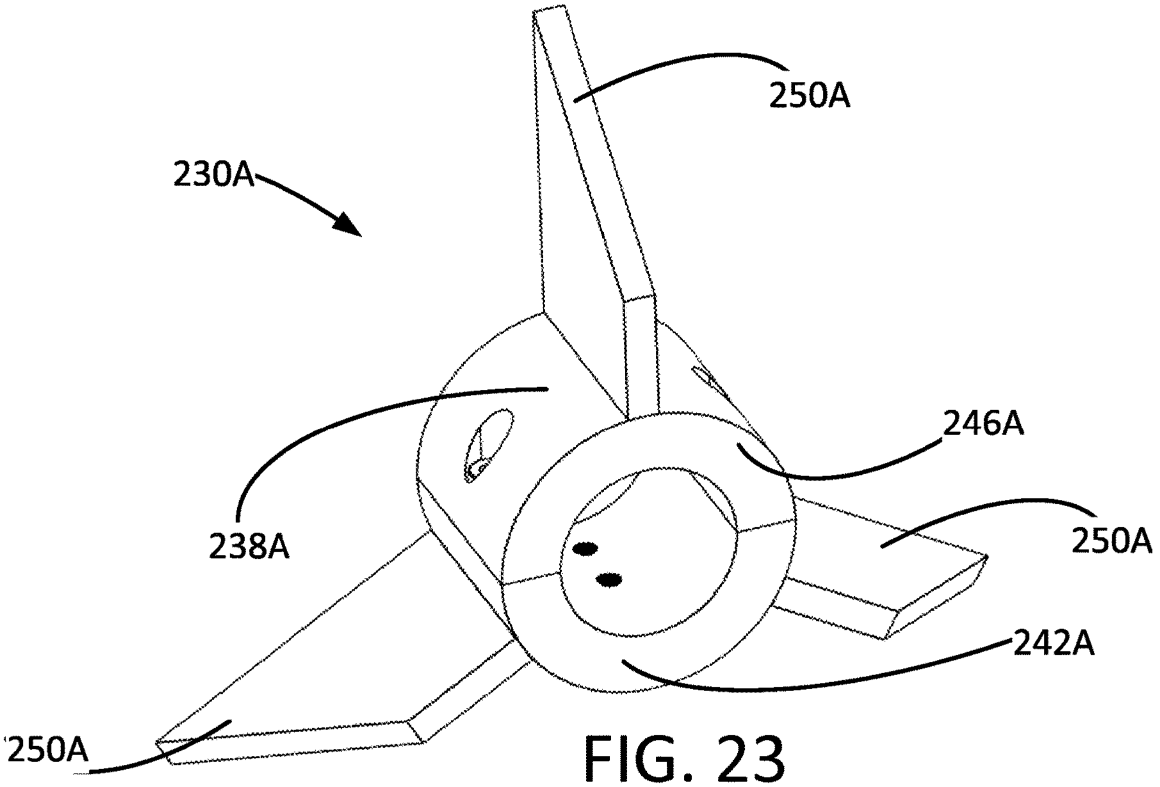
FIG. 23 is a perspective view of another cone member of an alignment cone assembly for the portable boring assembly.
Figure 24:
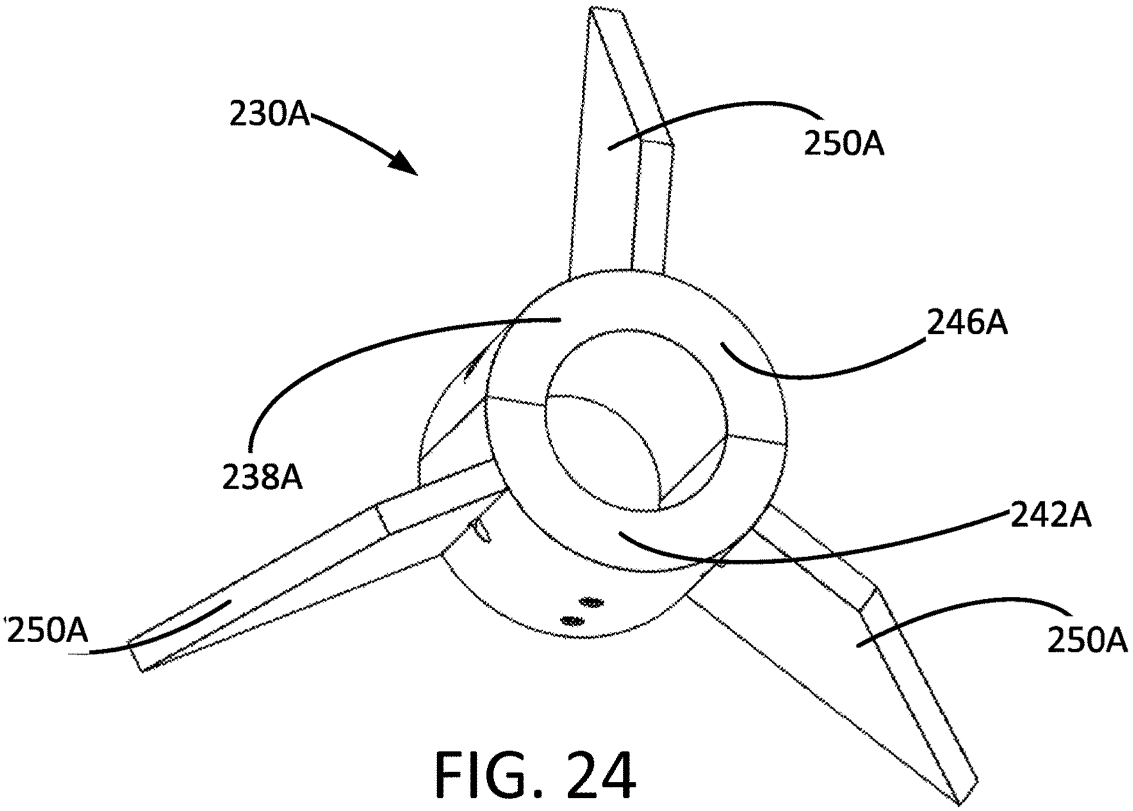
FIG. 24 is another perspective view of the cone member of FIG. 23.

FIGS. 23-24 illustrate another cone member 230A. The cone member 230A is similar to the cone member 230 described above and common elements have the same reference number "A".

As illustrated, the cone member 230A is a split cone member. Rather than triangular fins 250, each illustrated fin 250A of the cone member 230A has a trapezoidal cross-section.

Figure 25:
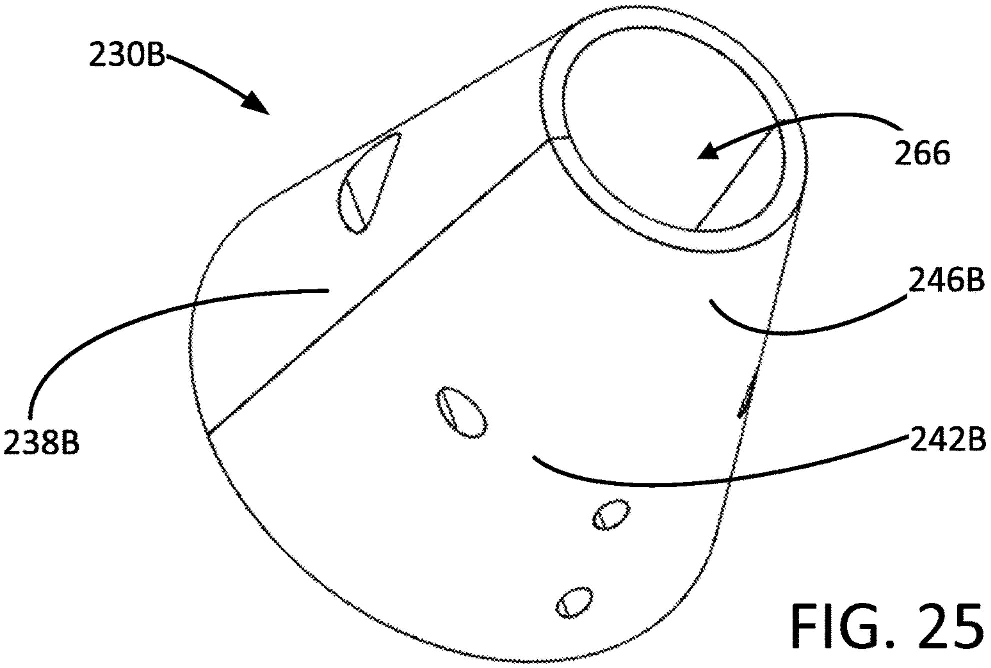
FIG. 25 is a perspective view of another cone member of an alignment cone assembly for the portable boring assembly.
Figure 26:
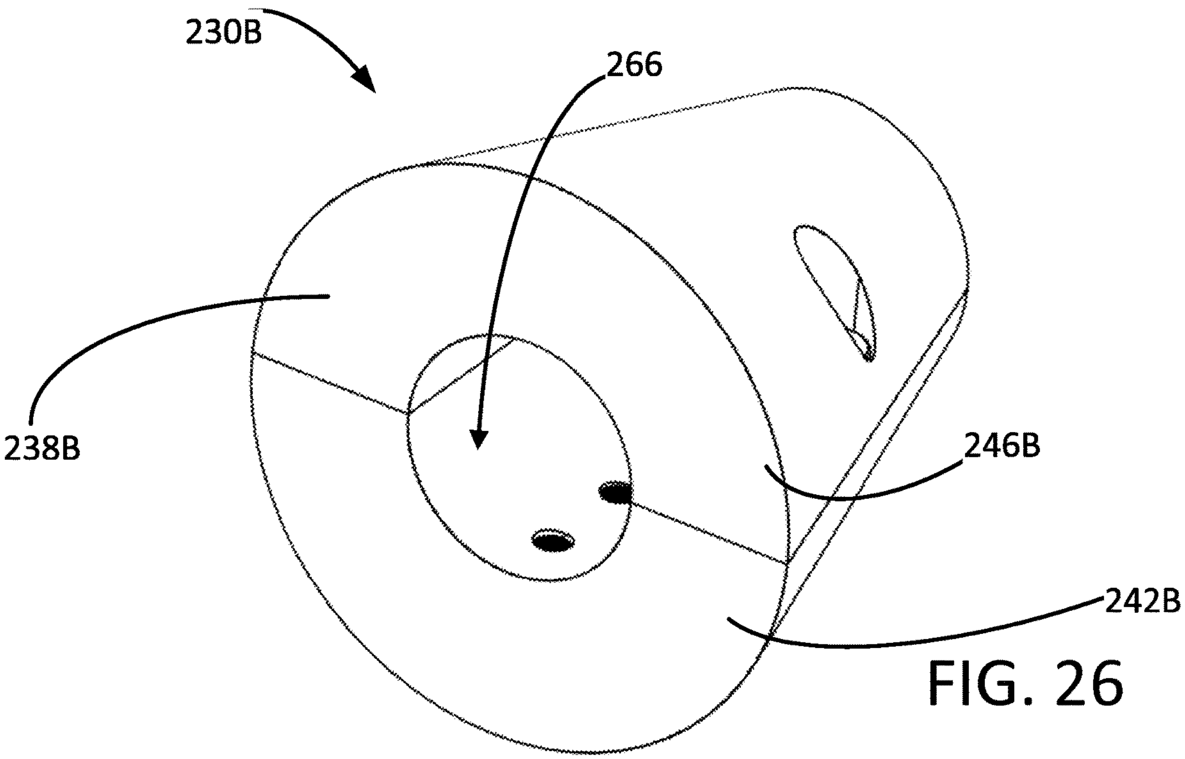
FIG. 26 is a perspective view of the cone member of FIG. 25.

FIGS. 25-26 illustrate another cone member 230B. The cone member 230B is similar to the cone member 230, 230A described above and common elements have the same reference number "B".

As illustrated, the cone member 230B is a split cone member. The cone member portions 238B and 242B form a frustoconical sleeve 246B defining an opening 266 which receives the boring bar 14. Rather than having fins 250, 250A, the tapered outer surface of the frustoconical sleeve 246B defines an outer diameter of the cone member 230B and is engageable with the workpiece to align the bar axis A with the bore.

Although the invention has been described with reference to certain embodiments, variations and modifications exist within the scope and spirit of the invention.

One or more independent features and/or independent advantages of the invention may be set forth in the following claims.

What is claimed is:

1. A feed assembly for a boring bar assembly, the boring bar assembly including a rotatably drivable boring bar extending along a bar axis and a lead screw extending along a screw axis, the feed assembly comprising:

a feed mechanism operable to move the boring bar along the bar axis as the boring bar rotates, the feed mechanism including a gear assembly selectively drivingly connectable between the boring bar and the lead screw, the gear assembly including a forward gear and a reverse gear; and an adjustment mechanism operable to adjust a direction of movement of the boring bar along the bar axis, the adjustment mechanism including an actuator pivotable about an adjustment axis, the actuator being pivotable between a forward position, in which the forward gear is engaged to cause movement of the boring bar in a forward direction along the bar axis, and a reverse position, in which the reverse gear is engaged to cause movement of the boring bar in an opposite reverse direction along the bar axis;

wherein the feed mechanism includes a collar supported on the lead screw nut for rotation about the screw axis and for axial movement along the lead screw nut, and wherein, in the forward position, the actuator causes the collar to engage the forward gear, and, in the reverse position, the actuator causes the collar to engage the reverse gear;

wherein the actuator includes a shifter pin connected between the actuator and the collar and configured to convert pivoting movement of the actuator into axial movement of the collar, and wherein the collar defines an annular groove extending transverse to the screw axis, the shifter pin being received in the annular groove.

2. A feed assembly for a boring bar assembly, the boring bar assembly including a boring bar that is rotatable and extends along a boring bar axis and a lead screw that extends along a screw axis, the feed assembly comprising:

a feed mechanism configured to move the boring bar along the boring bar axis as the boring bar is rotated, the feed mechanism including a gearset selectively drivingly connectable between the boring bar and the lead screw, the gearset including a forward gear and a reverse gear; and an adjustment mechanism operable to adjust a direction of movement of the boring bar along the bar axis, the adjustment mechanism including a shift actuator pivotable about an adjustment axis, the shift actuator being pivotable between a forward position in which the forward gear is engaged to cause movement of the boring bar in a forward direction along the bar axis, and a reverse position in which the reverse gear is engaged to cause movement of the boring bar in an opposite reverse direction along the bar axis.

3. The feed assembly according to claim 2, wherein the shift actuator is pivotable into a neutral position in which the forward gear and the reverse gear are not engaged so that the boring bar does not move along the bar axis.

4. The feed assembly according to claim 3, wherein the neutral position is between the forward position and the reverse position.

5. The feed assembly according to claim 2, wherein the shift actuator includes a pivotable lever.

6. The feed assembly according to claim 2, further comprising a lead screw nut that is threaded onto and axially movable along the lead screw upon rotation of the lead screw nut relative to the lead screw.

7. The feed assembly according to claim 6, wherein the forward gear and the reverse gear are mounted on the lead screw nut, and further comprising a gear configured to cause the forward gear and the reverse gear to rotate in opposite directions, and a collar that is axially movable along the lead screw nut between the forward gear and the reverse gear.

8. The feed assembly according to claim 7, wherein the shift actuator includes a pivotable lever that is coupled to the collar so that pivoting of the pivotable lever moves the collar into engagement with the forward gear and alternatively into engagement with the reverse gear.

9. The feed assembly according to claim 8, wherein the pivoting lever is coupled to the collar by a shifter arm and a shifter pin.

10. The feed assembly according to claim 9, wherein the shifter pin is pivotable relative to the shifter arm and is seated in a groove in the collar.

11. The feed assembly according to claim 10, wherein the pivoting of the pivoting lever causes sidewalls of the shifter pin to engage sidewalls of the groove and thereby move the collar along the lead screw nut.

12. The feed assembly according to claim 11, wherein forwardly pivoting the pivoting lever causes the shifter pin to move the collar to engage the forward gear, which causes the collar to transmit torque from the forward gear to the lead screw nut so that the lead screw nut is forwardly rotated to move the feed assembly in a forward direction along the lead screw, and rearwardly pivoting the pivoting lever causes the shifter pin to move the collar to engage the reverse gear, which causes the collar to transmit torque from the reverse gear to the lead screw nut so that the lead screw nut is reversely rotated to move the feed assembly in a reverse direction along the lead screw.

13. The feed assembly according to claim 6, further comprising a handle that is operable to manually move the boring bar.

14. The feed assembly according to claim 13, wherein the handle is coupled to the lead screw nut by a gear configured so that rotation of the handle rotates the lead screw nut.

15. The feed assembly according to claim 14, further comprising a cam hub coupled to the boring bar so that axial movement of the feed assembly causes axial movement of the boring bar, wherein rotation of the boring bar in the cam hub causes axial movement of the feed assembly and thus axial movement of the boring bar.

16. The feed assembly according to claim 15, wherein the cam hub includes a cam surface that extends around a circumference of the cam hub, and further comprising a rocker that is pivotably coupled to the feed assembly and a cam follower that follows the cam surface during rotation of the cam hub and causes pivoting movement of the rocker.

17. The feed assembly according to claim 16, wherein the cam follower is biased onto the cam surface by a spring.

18. The feed assembly according to claim 16, wherein the rocker is operatively coupled to the gearset so that pivoting of the rocker causes rotation of the gearset.

19. The feed assembly according to claim 16, further comprising a feed rate actuator configured to move a feed gauge towards and away from the rocker to adjust a feed rate of the feed assembly.

20. The feed assembly according to claim 19, wherein the feed gauge is configured to move linearly.

21. The feed assembly according to claim 19, further comprising a feed rate indicator that moves with the feed gauge to indicate a feed rate of the boring bar.

22. The feed assembly according to claim 16, further comprising a stop pin configured to limit a pivoting range of the rocker.

* * * * *